United States Patent
Tashiro et al.

(10) Patent No.: US 6,930,736 B2
(45) Date of Patent: Aug. 16, 2005

(54) REFLECTION-TYPE LIQUID CRYSTAL DISPLAY DEVICE AND FABRICATION PROCESS THEREOF

(75) Inventors: Kunihiro Tashiro, Kawasaki (JP); Norio Sugiura, Kawasaki (JP); Katsufumi Ohmuro, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 10/754,941

(22) Filed: Jan. 9, 2004

(65) Prior Publication Data

US 2004/0141117 A1 Jul. 22, 2004

Related U.S. Application Data

(62) Division of application No. 10/316,659, filed on Dec. 11, 2002.

(30) Foreign Application Priority Data

Dec. 11, 2001 (JP) ......................................... 2001-377791

(51) Int. Cl.[7] ....................... G02F 1/1333; G02F 1/1335
(52) U.S. Cl. .......................................... 349/86; 349/114
(58) Field of Search ........................ 349/114, 86, 88–90

(56) References Cited

U.S. PATENT DOCUMENTS

| | | | |
|---|---|---|---|
| 5,526,149 A | 6/1996 | Kanbe et al. | 359/70 |
| 5,949,507 A | 9/1999 | Shimada et al. | 349/113 |
| 6,188,456 B1 | 2/2001 | Koma | 349/113 |
| 6,369,870 B1 | 4/2002 | Koma | 349/130 |
| 6,707,519 B1 * | 3/2004 | Okumura et al. | 349/114 |
| 2002/0030776 A1 * | 3/2002 | Khan et al. | 349/114 |

FOREIGN PATENT DOCUMENTS

| | | |
|---|---|---|
| JP | 6-186544 | 7/1994 |
| JP | 6-337421 | 12/1994 |
| JP | 11-95195 | 4/1999 |
| JP | 11-237649 | 8/1999 |
| JP | 2001-83519 | 3/2001 |

* cited by examiner

Primary Examiner—James A. Dudek
(74) Attorney, Agent, or Firm—Greer, Burns & Crain, Ltd.

(57) ABSTRACT

A reflection-type liquid crystal display device includes a first substrate, a second substrate facing the first substrate and carrying projections and depressions, a reflective electrode on the second substrate so as to cover the projections and depressions and in electrical contact with a switching device provided on the second substrate via a contact hole, and a negative liquid crystal layer between the first and second substrates, wherein the contact hole is disposed centrally to the reflection electrode and a structure controlling alignment of liquid crystal molecules in the liquid crystal layer is disposed so as to overlap the contact hole viewed in a direction perpendicular to the second substrate.

8 Claims, 24 Drawing Sheets

5%    10%    25%

LARGE ─────────────────────► SMALL
         VA
         companent
         % to entire
         diamine

LARGE ─────────────────────► SMALL
         LIGHT
         LEAK

REFLECTION INTENSITY

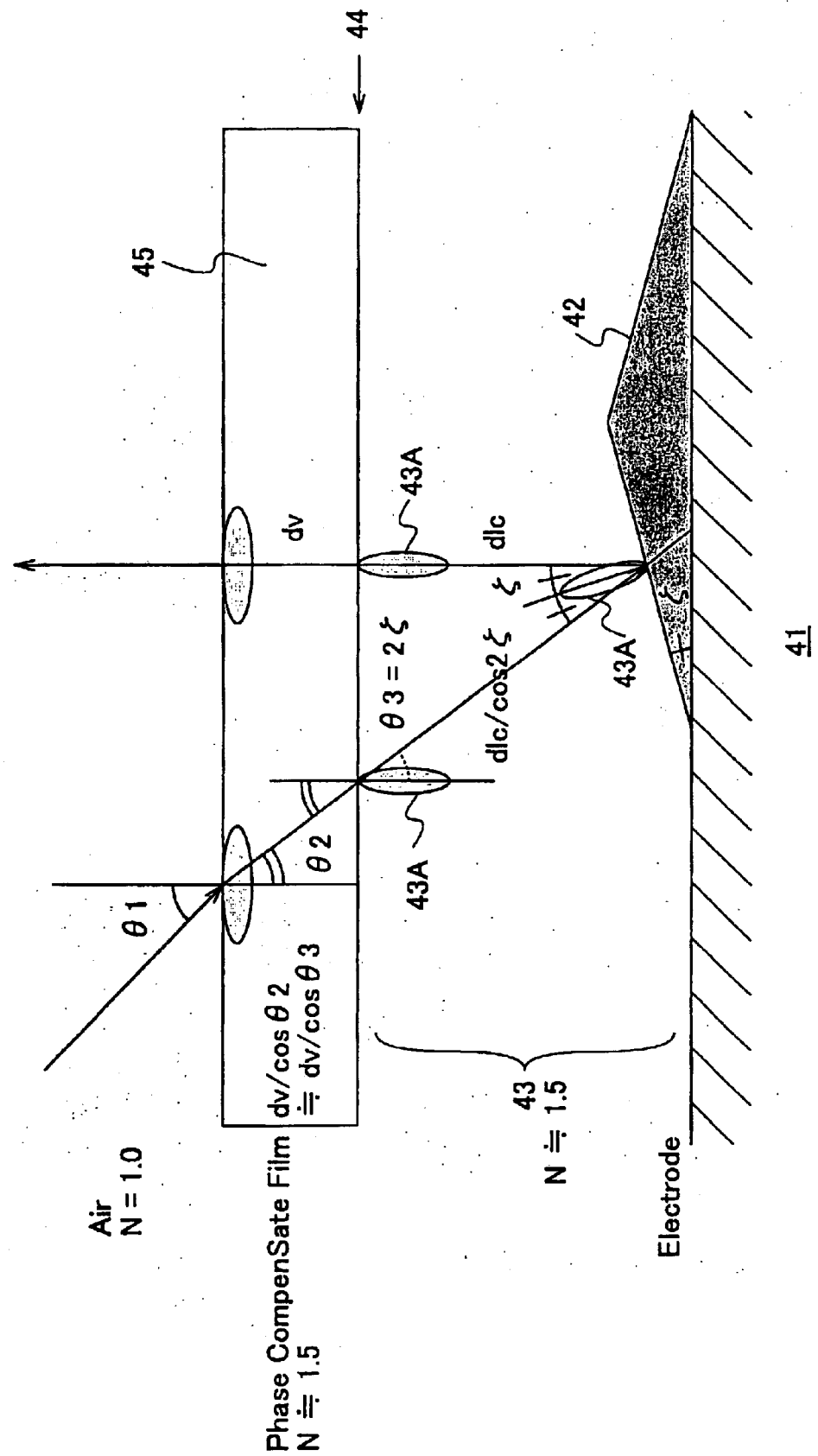

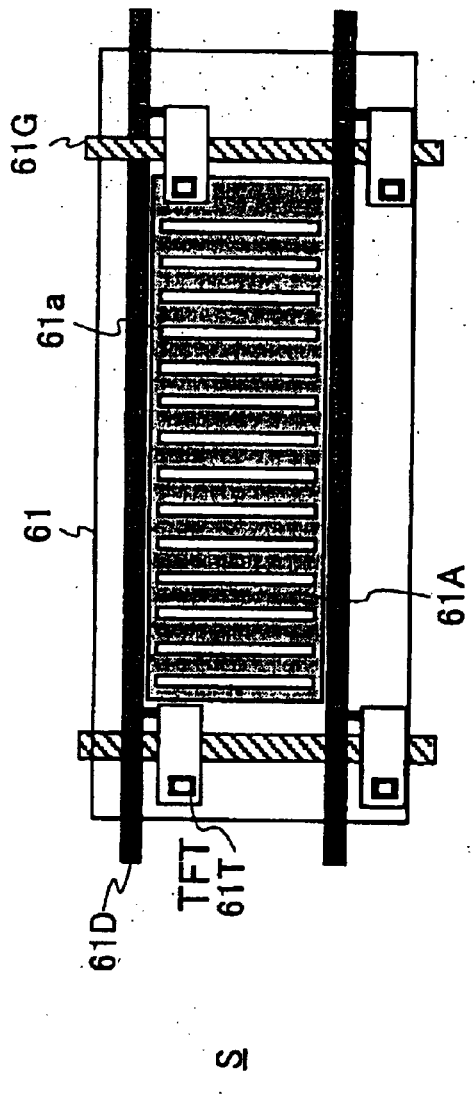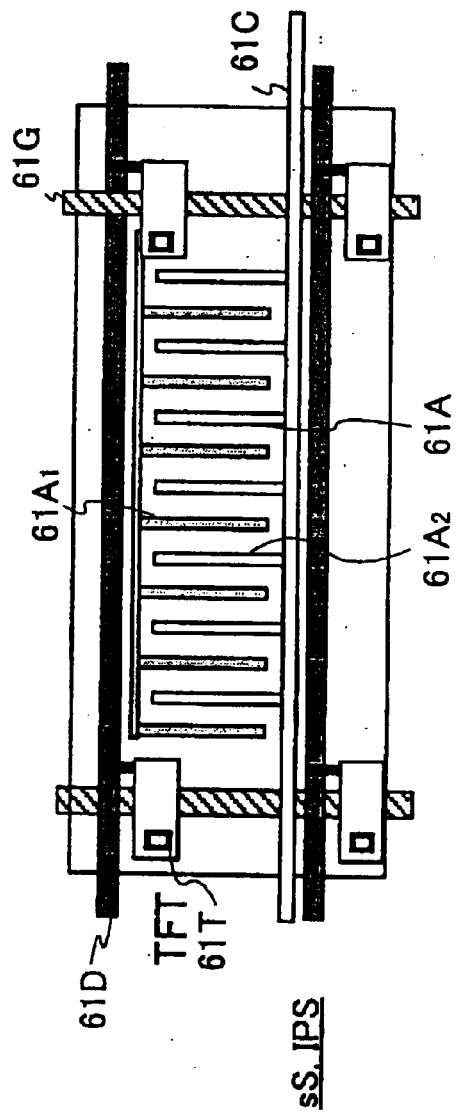
FIG.25A
FIG.25B

REFLECTION-TYPE LIQUID CRYSTAL DISPLAY DEVICE AND FABRICATION PROCESS THEREOF

CROSS-REFERENCE TO RELATED APPLICATION

This is a divisional of application Ser. No. 10/316,659, filed Dec. 11, 2002.

The present application is based on Japanese priority application No.2001-377791 filed on Dec. 11, 2001, the entire contents of which are hereby incorporated by reference.

BACKGROUND OF THE INVENTION

The present invention generally relates to reflection-type liquid crystal display devices used in a low-power apparatuses such as portable terminals.

A reflection-type liquid crystal display device is a liquid crystal display device that achieves display of images by incorporating environmental light such as interior illumination light or sunlight and causing the same to reflect toward an observer by means of a reflector.

Because of the operational principle, the reflection-type liquid crystal display device does not need a backlight and has an advantageous feature of low power consumption. Thus, reflection-type liquid crystal display devices are used extensively for portable terminals.

In order to achieve bright and clear representation of images in a reflection-type liquid crystal display device, it is necessary to design the liquid crystal display device such that as much environmental light as possible is incorporated and reflected toward the observer in the white representation mode and that the reflection of the incorporated light toward the observer is suppressed as much as possible in the black representation mode.

Thus, there is a proposal of a reflection-type liquid crystal display device that uses a phase-change type guest-host (GH) mode (D. L. White and G. N. Taylor, J. Appl. Phys. 45, pp.4718, 1974). Because a GH-mode reflection-type liquid crystal display device does not require a polarizer, there is a distinct advantage in such a GH-mode reflection-type liquid crystal display device that a bright representation is achieved in the white representation mode.

On the other hand, a GH-mode liquid crystal display device has a drawback in that a bright representation is obtained also in the back representation mode and the contrast ratio is limited to the range of 5–6.

Meanwhile, there is a proposal of a reflection-type liquid crystal display device of a twisted nematic mode that uses a single polarizer as in the Japanese Laid-Open Patent Publication 6-11711.

This conventional reflection-type liquid crystal display device is basically a horizontally oriented liquid crystal device in which liquid crystals having a positive dielectric anisotropy are twisted. In the foregoing conventional reflection-type liquid crystal display device, the incoming environmental light is converted to a linear polarization light by a polarizer, and the linearly polarized light thus obtained is passed through a liquid crystal layer or a phase compensation film having a ¼-wavelength retardation, so that there is achieved a 90 degree angle of polarization plane between the incident light passed through the polarizer and the reflection light returning to the polarizer.

Thus, in this conventional liquid crystal display device, the black representation is achieved by absorbing the rotated reflection light by the polarizer. Because of the use of the polarizer, the foregoing conventional liquid crystal display device can provide only about 40% of brightness in the while representation mode as compared with the case of the GH-mode liquid crystal display device. However, the liquid crystal display device can achieve a contrast ratio of 12–14 in view of efficient absorption of the light in the black representation mode.

Further, there is a proposal of improving the contrast ratio in a TN-mode liquid crystal display device by way of compensating for the black representation, by reducing the amount of retardation of the phase compensation film by the magnitude of the residual retardation of the liquid crystal layer. See Japanese Laid-Open Patent Publication 11-311784. With this, the contrast ratio is improved to about 16–18.

In a reflection-type liquid crystal display device, the visibility of representation is defined by brightness and contrast ratio. Thus, a high visibility is achieved even in the case of low contrast ratio when the representation is bright. When the representation is dark, on the other hand, a large contrast ratio is required. See The Journal of the Institute of Television Engineers of Japan, Vol.50, No.8, pp.1091–1095 (1996).

A contrast ratio of about 12 is needed in order to realize the visibility comparable to that of a GH-mode liquid crystal display device by using a liquid crystal display device having a single polarizer, the latter liquid crystal display device can provide the brightness of only 40% of the brightness of a GH-mode liquid crystal display device. By using the technology noted in the above reference, it becomes possible to achieve a contrast ratio of 16–18 by using a T-N mode liquid crystal display device.

Because of the foregoing reason, and further in view of better reliability, a TN-mode liquid crystal display device having a single polarizer is used widely in these days for a reflection-type liquid crystal display device.

In a TN-mode liquid crystal display device having a single polarizer, it should be noted that the upper and lower substrates are subjected to rubbing processing in different directions so as to realize the twisted structure in the liquid crystal layer. As a consequence, the anchoring direction of the liquid crystal layer is not coincident in the upper and lower substrates.

Because of this, the technology of the foregoing Japanese Laid-Open Patent Publication 11-311784 sets the retardation axis of the phase compensation film at the angle intermediate between the upper and lower anchoring directions so as to compensate for the synthetic vector of the upper and lower anchoring directions. However, this construction cannot compensate for the residual retardation of the liquid crystal layer at the upper and lower substrates individually and the compensation for the black representation remains incomplete.

Meanwhile, there is a proposal of a reflection-type liquid crystal display device of vertically aligned (VA)-mode that uses a single polarizer (See Japanese Laid-Open Patent Publication 6-337421).

In such a VA-mode liquid crystal display device, the On and Off operation is just the opposite as in the case of a TN-mode liquid crystal display device. On the other hand, the operational features of: converting the incoming environmental light to linearly polarized light by the polarizer; rotating the polarization plane of the linearly polarized light thus obtained by 90 degrees by using a liquid crystal layer or a phase compensation film having a retardation of about ¼ wavelength of visible light; and causing the polarizer to absorb the rotated linearly polarized light in the black representation mode, are identical between the foregoing VA-mode liquid crystal display device and the TN-mode liquid crystal display device.

On the other hand, the VA-mode reflection-type liquid crystal display device is advantageous in the point that there remains no liquid crystal layer causing anchoring at the liquid crystal/substrate interface in the black representation mode contrary to the case of the TN-mode liquid crystal display device because of the fact that the black representation mode is achieved in the VA-mode reflection-type liquid crystal display device in the state no voltage is applied to the liquid crystal layer. Thereby, the contrast ratio of image representation is improved significantly.

In this way, the VA-mode reflection-type liquid crystal display device has an advantageous feature of high contrast ratio and excellent visibility.

On the other hand, there still exist problems to be solved in such a VA-mode reflection-type liquid crystal display device particularly with regard to the control of alignment of the liquid crystal molecules.

More specifically, a VA-mode liquid crystal display device generally uses a vertical alignment film, while the performance of such a vertical alignment film may be degraded seriously when subjected to a rubbing process. For example, there may be caused defective display of images such as uneven brightness extending in the form of streaks Because of this reason, there is a need of achieving alignment control of liquid crystal molecules in a VA-mode liquid crystal display device by means other than rubbing.

In the Japanese Laid-Open Patent Publication 10-301112, for example, the alignment control of the liquid crystal molecules is achieved by providing a slit extending obliquely in a reflection electrode on the opposite substrate, such that there is induced an oblique electric field between the upper and lower substrates upon application of a voltage.

This technology, on the other hand, has a drawback in that the overall reflectivity of the pixels is reduced because the part of the liquid crystal layer located immediately on the slit does not undergo switching and the visibility of the image representation is not very much improved even when the contrast ratio is improved.

Thus, there has been a need of improving the contrast ratio without sacrificing the reflectivity in a VA-mode liquid crystal display device.

Meanwhile, a reflection-type liquid crystal display device generally has a problem of the visibility influenced heavily by the optical environment such that the visibility of the images is degraded seriously in the dark optical environment. With this respect, a transmission-type liquid crystal display device having a backlight provides far superior visibility. On the other hand, a transmission-type liquid crystal display device suffers from the problem of poor visibility in the bright optical environment in that the obtained visibility is inferior to the visibility achieved by the reflection-type liquid crystal display device.

Thus, in order to improve the foregoing problems, there has been proposals such as using a front light in combination with a reflection-type liquid crystal display device, or a reflection-type liquid crystal display device having a semi-transparent reflection film.

The approach of using a front light, however, suffers from the problem in that the contrast ratio achieved in the dark optical environment may be inferior to the contrast ratio of the direct-view type transmission-type liquid crystal display device. In the bright optical environment, on the other hand, there may arise another problem in that the representation becomes dark as compared with the conventional reflection-type liquid crystal display device because of the existence of the front light.

In the case of using a semi-transparent film, a metal thin film is generally used for this purpose. However, a metal thin film has a large absorption coefficient and has a problem in the efficiency of utilization of light. Further, the metal thin film suffers from the problem of conspicuous variation of transmittance because of the in-plane variation of film thickness. It should be noted that such a metal thin film is generally provided by a thin Al film having a thickness of about 30 nm. Currently, it is difficult for form a metal thin film with uniform thickness over a wide display area.

In order to eliminate the foregoing problem, there has been a proposal in the Japanese Laid-Open Patent Publication 11-281972 in which there is provided a transparent window by means of a transparent electrode such as ITO ($In_2O_3 \cdot SnO_2$) at the central part of the pixels. According to this conventional proposal, the foregoing problems are eliminated and it became possible to construct a reflection-transmission-type liquid crystal display device.

On the other hand, the foregoing conventional proposal of the reflection-transmission-type liquid crystal display device has needed formation of projections and depressions on a planarized film and formation of a step in the transmission region by forming a hole. Further, the foregoing technology requires formation of both the transparent electrode (ITO) and the reflection electrode (Al) and further the formation of a barrier metal film for preventing electrolytic corrosion, which may be caused at the contacting part of the Al pattern and the ITO pattern. Thus, the fabrication process of the liquid crystal display device is complex and the cost of fabrication could not be reduced.

Further, the conventional reflection-type liquid crystal display device, relying upon the principle of optical switching caused by retardation of the liquid crystal layer, has to be designed to have a cell thickness of ½ of the wavelength of the visible light in the transmission region and a cell thickness of ¼ of the wavelength of the visible light in the reflection region. However, such a structure has been difficult to produce.

SUMMARY OF THE INVENTION

Accordingly, it is a general object of the present invention to provide a novel and useful liquid crystal display device wherein the foregoing problems are eliminated.

Another and more specific object of the present invention is to provide a reflection-type liquid crystal display device and fabrication process thereof capable of realizing a high reflectivity and high contrast ratio.

Another object of the present invention is to provide a reflection-transmission-type liquid crystal display device capable of being produced with low cost and having excellent characteristics.

Another object of the present invention is to provide a reflection-type liquid crystal display device, comprising:

a first substrate;

a second substrate disposed so as to face said first substrate, said second substrate carrying projections and depressions thereon;

a reflective electrode provided on said second substrate so as to cover said projections and depressions in electrical contact with a switching device provided on said second substrate via a contact hole; and a liquid crystal layer provided between said first and second substrates, said liquid crystal layer having a negative dielectric anisotropy, wherein said contact hole is disposed centrally to said reflection electrode, and wherein a structure controlling alignment of liquid crystal molecules in said liquid crystal layer is disposed so as to overlap said contact hole when said second substrate is viewed in a direction perpendicular thereto.

According to the present invention, the degradation of reflectivity, caused by the foregoing structure for controlling the alignment of the liquid crystal molecules, is minimized by forming the structure in correspondence to the contact hole where there is caused a degradation of reflectivity because of the absence of the projections and depressions.

By forming the contact hole at the central part of the pixel electrode so as to avoid the peripheral part in which the liquid crystal molecules are tilted in the inward direction as a result of the action of the oblique electric field, it becomes possible to define four sectors in each pixel electrode by two hypothetical diagonal lines crossing at the center where the foregoing structure is provided.

In such a construction, the liquid crystal molecules of different alignment directions interfere with each other on the foregoing diagonal lines, resulting in an offset in the molecular alignment direction. On the other hand, such a construction can successfully eliminate the azimuth dependence of the reflection light by converging the light incoming to the liquid crystal layer to a circularly polarized light by providing a phase compensation film having a retardation of about ¼ of the visible wavelength. Thereby, the degradation of reflectivity caused by deviation of the azimuth angle of the reflected light is successfully suppressed.

Another object of the present invention is to provide a method of fabricating a reflection-type liquid crystal display device comprising a first substrate, a second substrate provided so as to face said first substrate, said second substrate carrying thereon projections and depressions having a reflectivity, a liquid crystal layer having a negative dielectric anisotropy provided between said first and second substrates, and an optically polymerized polymer structure provided between said first and second substrates, said method comprising the steps of:

causing optical polymerization of a compound constituting said polymer structure by irradiating light perpendicularly to said second substrate and causing reflection of said light by said projections and depressions in an in-plane direction of said second substrate;

said step of causing optical polymerization is conducted by providing an in-plane directivity to the light reflected by said projections and depressions by a optimizing a shape of said projections and depressions, such that said optical polymerization is conducted in a direction corresponding to said in-plane directivity.

According to the present invention, it becomes possible to stabilize the alignment of the liquid crystal molecules by the use of the optically polymerized polymer structure formed in the liquid crystal layer at the time of application of a control voltage. In such an optically polymerized polymer structure, the polymer chains can be formed in an arbitrary direction by conducting optical irradiation in the state of applying a voltage to the optically polymerized polymers dispersed in the liquid crystal layer. Thereby, the alignment of the liquid crystal molecules at the time of application of the voltage is stabilized because of the affinity between the polymer chain and the liquid crystal molecules.

In the present invention, it should be noted that the projections and depressions are designed so as to reflect the obliquely incoming light toward the observer. When light is directed perpendicularly in such a substrate, the light is reflected by the projections and depressions in the in-plane direction of the substrate. Thus, by causing the optically polymerizable polymer by the light directed perpendicularly to the substrate surface, it becomes possible to form a polymer chain corresponding to the directivity of reflection. As the liquid crystal molecules are aligned along the optically polymerizable polymer thus formed, the alignment of the liquid crystal molecules is stabilized.

Another object of the present invention is to provide a reflection-type liquid crystal display device, comprising:

a first substrate;

a second substrate disposed so as to face said first substrate;

a liquid crystal layer having a negative dielectric anisotropy disposed between said first and second substrates; and a vertical alignment film formed on a surface of said first substrate and a surface of said second substrate, wherein said alignment film contains a vertical alignment component with a proportion of 25% or more with regard to total diamine components.

According to the present invention, it becomes possible to achieve a sufficient contrast ratio even in the case the substrate of the reflection-type liquid crystal display device is the one having a reflective projections and depressions thereon, by setting the proportion of the vertical alignment component in the vertical alignment film to be 25% or more with respect to the entire diamine components.

Another object of the present invention is to provide a reflection-type liquid crystal display device, comprising:

a first substrate;

a second substrate disposed so as to face said second substrate, said second substrate carrying thereon projections and depressions having a reflectivity;

a liquid crystal layer having a negative dielectric anisotropy disposed between said first and second substrates; and a polarizer disposed at an outer side of said first substrate such that an absorption axis of said polarizer extends generally parallel to a direction in which a reflection intensity caused by said projections and depressions becomes maximum.

According to the present invention, it becomes possible to improve the contrast ratio of the liquid crystal display device by setting the direction of the absorption axis of the polarizer to be generally coincident with the direction in which the reflection intensity of the reflection from the projections and depressions becomes maximum. The present invention utilizes the phenomenon that the optical absorption efficiency of the polarizer is higher in the direction of the optical absorption axis, in which direction the polarizing components such a iodine or dichroic dyes are aligned, than other directions. By aligning the direction of the polarizer in which the efficiency of optical absorption is maximum to be coincident with the direction in which the reflection from the depressions and projections is the strongest, the present invention suppresses the brightness at the time of the black representation mode further.

Of course, such a setting of the absorption axis of the polarizer results in a decrease of brightness also in the white representation mode. In the case of the reflection-type liquid crystal display device having the reflective projections and depressions thereon, on the other hand, actual degradation of brightness in the white representation mode is suppressed minimum because the light from every direction is reflected in the direction perpendicular to the substrate. Thus, the present invention can achieve the improvement of contrast ratio without sacrificing the brightness of the reflection-type liquid crystal display device.

Another object of the present invention is to provide a reflection-type liquid crystal display device, comprising:

a first substrate;

a second substrate disposed so as to face said first substrate, said second substrate carrying projections and depressions having a reflectivity;

a liquid crystal layer having any of positive or negative dielectric anisotropy provided between said first and second substrates; and a polarizer disposed at an outer side of said first substrate, an optical phase compensation film disposed between said first substrate and said polarizer, said optical phase compensation film having a negative dielectric anisotropy in a direction perpendicular to a plane of said first substrate, said optical phase compensation film having a retardation $df\{(n_x+n_y)/2-n_z\}$ so as to satisfy the relationship.

$$0.4 \leq [df\{(n_x+n_y)/2-n_z\}]/(dlc\Delta n) \leq 0.7,$$

wherein $n_x$, $n_y$ and $n_z$ are refractive indices of said optical phase compensation film respectively in an x-direction, a y-direction and a z-direction, dlc is the thickness of said liquid crystal layer, and $\Delta n$ is a refractive index difference between an extraordinary ray and an ordinary ray in the liquid crystal layer.

According to the present invention, it is possible to compensate for the leakage light formed at the time of the black representation mode substantially completely in a reflection-type liquid crystal display device having a substrate carrying thereon reflective projections and depressions for the case in which the foregoing projections and depressions are optimized so as to incorporate as much environmental light as possible within a limitation that there is caused no interface reflection.

Another object of the present invention is to provide a reflection-transmission-type liquid crystal display device, comprising:

a first substrate;

a second substrate provided so as to face said first substrate;

a transparent electrode provided on a surface of said first substrate facing said second substrate;

a reflection electrode provided on a surface of said second substrate facing said first substrate, said reflection electrode having an opening;

a scattering layer provided between said first and second substrates, said scattering layer including therein a liquid crystal layer and changing an optical state thereof between a scattering state and a non-scattering state; and a pair of polarizers disposed at outer sides of a liquid crystal panel formed by said first substrate, said second substrate and said scattering layer, at least one of said polarizers is formed of a circular polarizer.

According to the present invention, optical switching between a white representation mode and a black representation mode is achieved by a transition of state of a polymer-dispersed liquid crystal between the scattering state and the non-scattering state. Thus, there is no need of providing a thick planarizing film having an opening acting as an optical window for securing a thickness for a liquid crystal layer required for optical switching in the transmission region, contrary to the conventional reflection-transmission-type liquid crystal display device. Further, there is no need of forming a scattering structure on a planarized surface. Further, there is no need of forming a transparent electrode corresponding to the optical window opening. In the present invention, it is sufficient to provide a reflection electrode having an optical passage such as a slit. Thus, according to the present invention, the construction of the reflection-transmission-type liquid crystal display device is significantly simplified.

Other objects and further features of the present invention will become apparent from the following detailed description when read in conjunction with the attached drawings.

BRIEF DESCRIPTION OF THE DRAWINGS

FIG. 12 is a diagram showing reflection of incident light in the reflection-type liquid crystal display device of FIG. 11;

FIGS. 25A and 25B are diagrams showing an example of a TFT substrate used in the present embodiment;

DETAILED DESCRIPTION OF THE PREFERRED EMBODIMENT

[First Embodiment]

Figure 1:
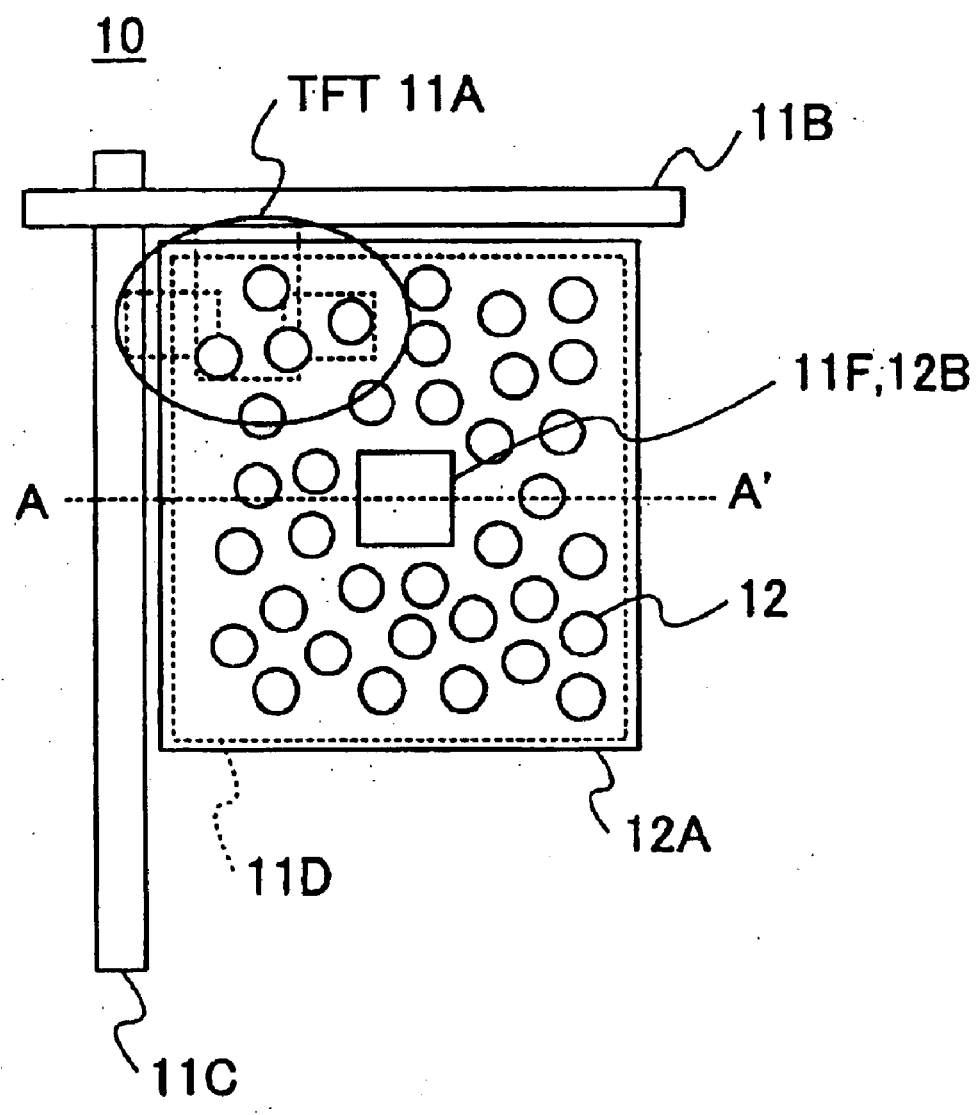
FIG. 1 is a diagram showing the construction of a pixel region of a reflection-type VA-mode liquid crystal display device according to a first embodiment of the present invention.
Figure 2:
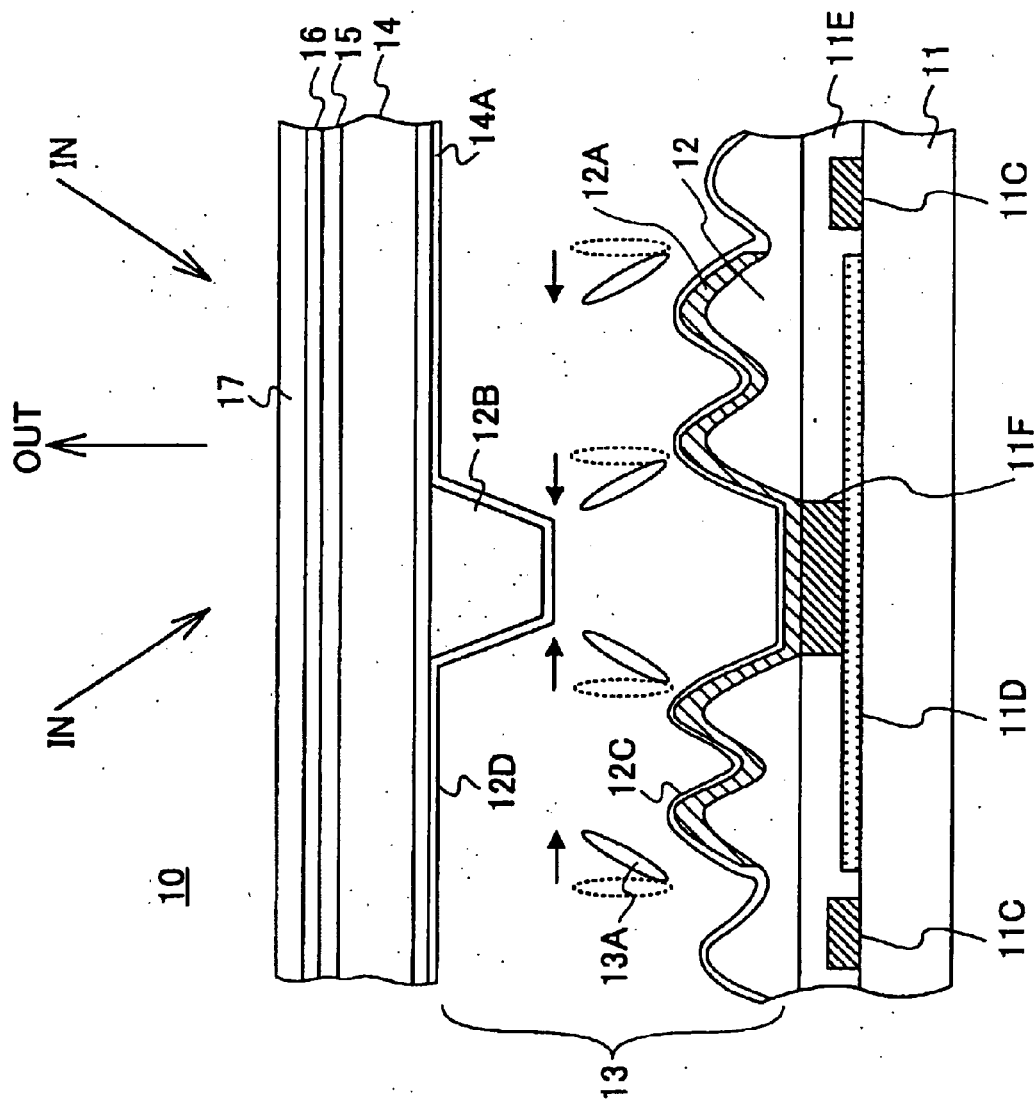
FIG. 2 is a diagram showing a cross-sectional structure of the reflection-type VA-mode liquid crystal display device of FIG. 1.

FIGS. 1 and 2 show respectively the plan view and a cross-sectional view of a reflection-type liquid crystal display device 10 according to a first embodiment of the present invention for the part corresponding to one pixel.

Referring to FIGS. 1 and 2, the reflection-type liquid crystal display device 10 is basically formed of a lower glass substrate 11, an upper glass substrate 14 facing the lower glass substrate 11, and a liquid crystal layer 13 having a negative dielectric anisotropy confined between the substrates 11 and 14, and the lower glass substrate 11 carries thereon a TFT (thin-film transistor) 11A and further a gate electrode 11B and a data electrode 11C cooperating with the TFT 11A. For the glass substrate 11, it is possible to use a conventional TFT substrate used in transmission-type liquid crystal display panels. In this case, a pixel electrode 11D of a transparent conductor such as ITO is provided on the glass substrate 11 in the state connected to the TFT 11A electrically.

The TFT 11A, the gate electrode 11B and the date electrode 11C are covered by an insulating film 11E such as a resin, and a projection and depression pattern 12 of a resist layer is provided on the foregoing insulating film 11E, wherein the projection and depression pattern 12 forms projections and depressions on the insulating film 11E.

The projection and depression pattern 12 is covered with a reflection electrode 12A, wherein the reflection electrode 12A is connected electrically to the pixel electrode 11D at the central part of the pixel region by way of a contact hole 11F formed in the insulating film 11E.

The reflection electrode 12A forms projections and depressions in correspondence to the projection and depression pattern 12 except for the part thereof corresponding to the contact hole 11F, and thus, there is formed a flat region in the pixel region at the central part thereof corresponding to the contact hole 11F.

On the opposing substrate 14, on the other hand, there is formed an opposing electrode 14A at the side thereof facing the substrate 11 uniformly and continuously, and there is formed an alignment control structure 12B on the opposing electrode 14A in the part thereof corresponding to the contact hole 11F by a resin or a dielectric material having a dielectric constant smaller than the dielectric constant of the liquid crystal layer 13, for controlling the alignment direction of the liquid crystal molecules 13A in the liquid crystal layer 13.

Further, there is formed a vertical alignment film 12C on the substrate 11 so as to cover the projection and depression pattern 12 and the reflection electrode 12A, and another vertical alignment film 12D is provided on the substrate 14 so as to cover the opposing electrode 14A and the alignment control structure 12B.

Figure 3:
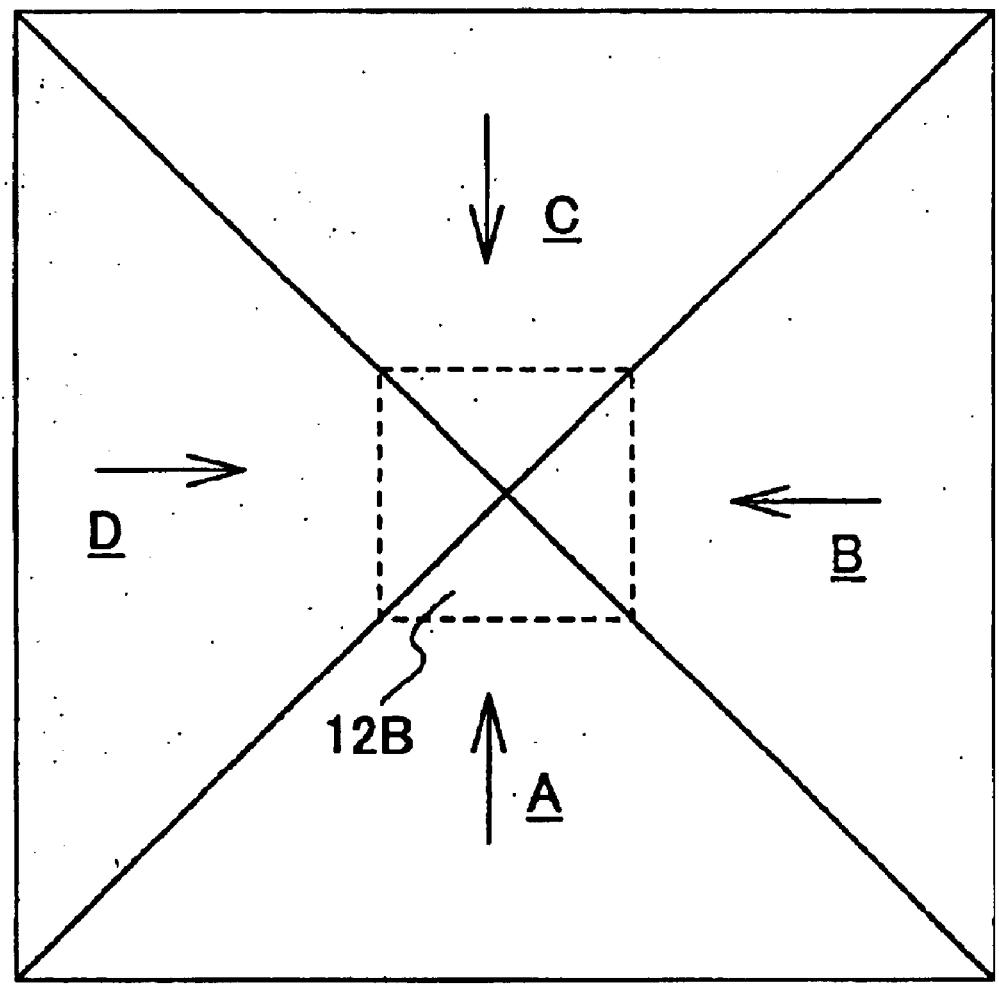
FIG. 3 is a diagram showing the domain structure formed in the reflection-type VA-mode liquid crystal display device of FIG. 1.

It should be noted that the alignment films 12C and 12D function so as to align the liquid crystal molecules 13A in the liquid crystal layer 13 in the direction generally perpendicular to the substrate 11 or 14 as illustrated in FIG. 2 by dotted lined in the non-activated state of the pixel in which no drive electric field is applied to the liquid crystal layer 13. On the other hand, because there is formed the alignment control structure 12B at the central part of the pixel in the liquid crystal display device 10 of FIGS. 1 and 2, the liquid crystal molecules are tilted toward the alignment control structure 12B, and as a result, there are formed domains A–D in the pixel region as represented in FIG. 3 in which the liquid crystal molecules are tilted in the direction indicated by the arrows.

Further, on the outer side of the substrate 14, there is formed a TAC (triacetate cellulose) film 15 having a retardation of about 100 nm in the thickness direction, and a phase compensation film 16 having a retadation of about ¼ of the visible wavelength and a polarizer 17 are laminated on the TAC film 15 consecutively.

In the reflection-type liquid crystal display device 10 of FIGS. 1 and 2, the environmental light incident obliquely to the polarizer 17 is converted to a linear polarized light by the polarizer 17 and incident to the liquid crystal layer 13 after being converted to a circularly polarized light by the ¼-wavelength film 16.

In the non-activated state of the liquid crystal display device 10 in which there is no voltage applied across the reflection electrode 12A and the opposing electrode 14A, it should be noted that the liquid crystal molecules 13A are aligned generally perpendicularly to the substrate 11 or 14 in the liquid crystal layer 13 as represented in FIG. 2, and the circularly polarized light incident to the liquid crystal layer 13 is reflected by the reflection electrode 12A. Thereby, the reflected light passes consecutively through the liquid crystal layer 13, the TAC film 15 and the ¼-wavelength film 16 consecutively in the reverse direction and is converted to a linearly polarized light having the polarization plane rotated by 90 degrees with regard to the initial polarization plane. Thereby, the linearly polarized light is cut off by the polarizer 17.

In the case a drive voltage is applied across the reflection electrode 12A and the opposing electrode 14A, on the other hand, the liquid crystal molecules 13A in the liquid crystal layer 13 are aligned generally parallel to or obliquely to the liquid crystal layer 13, and the circularly polarized light incident to the liquid crystal layer 13 through the ¼-wavelength film 16 and the TAC film 15 is converted to linearly polarized light by the retardation of the liquid crystal layer 13. The linearly polarized light thus formed is then reflected by the reflection electrode 12A and is passed through the ¼-wavelength film 16 and the TAC film 15 in the reverse direction consecutively. Thereby, the reflected linearly polarized light is converted to linearly polarized light having a polarization plane identical with the polarization plane of the linearly polarized light converted from the incident light at the polarizer 17, and the linearly polarized light thus obtained is exited through the polarizer 17.

In the reflection-type liquid crystal display device 10 of such a construction, it should be noted that there is formed no projection and depression pattern 12 in the part corresponding to the contact hole 11F as a result of formation of the contact hole 11F in the reflection electrode 12A, and thus, the environmental light incident to the substrate 14 obliquely is not reflected back to the observer in the part of the reflection electrode 12A where the contact hole is formed. Because of this, the problem of degradation of reflectivity at the central part of the pixel cannot be avoided in the reflection-type liquid crystal display device 10 having the construction of FIGS. 1 and 2.

Further, optical loss caused by the alignment control structure 12B cannot be avoided even though the alignment control structure 12B is formed of a transparent resin for minimizing the optical loss.

Figure 4:
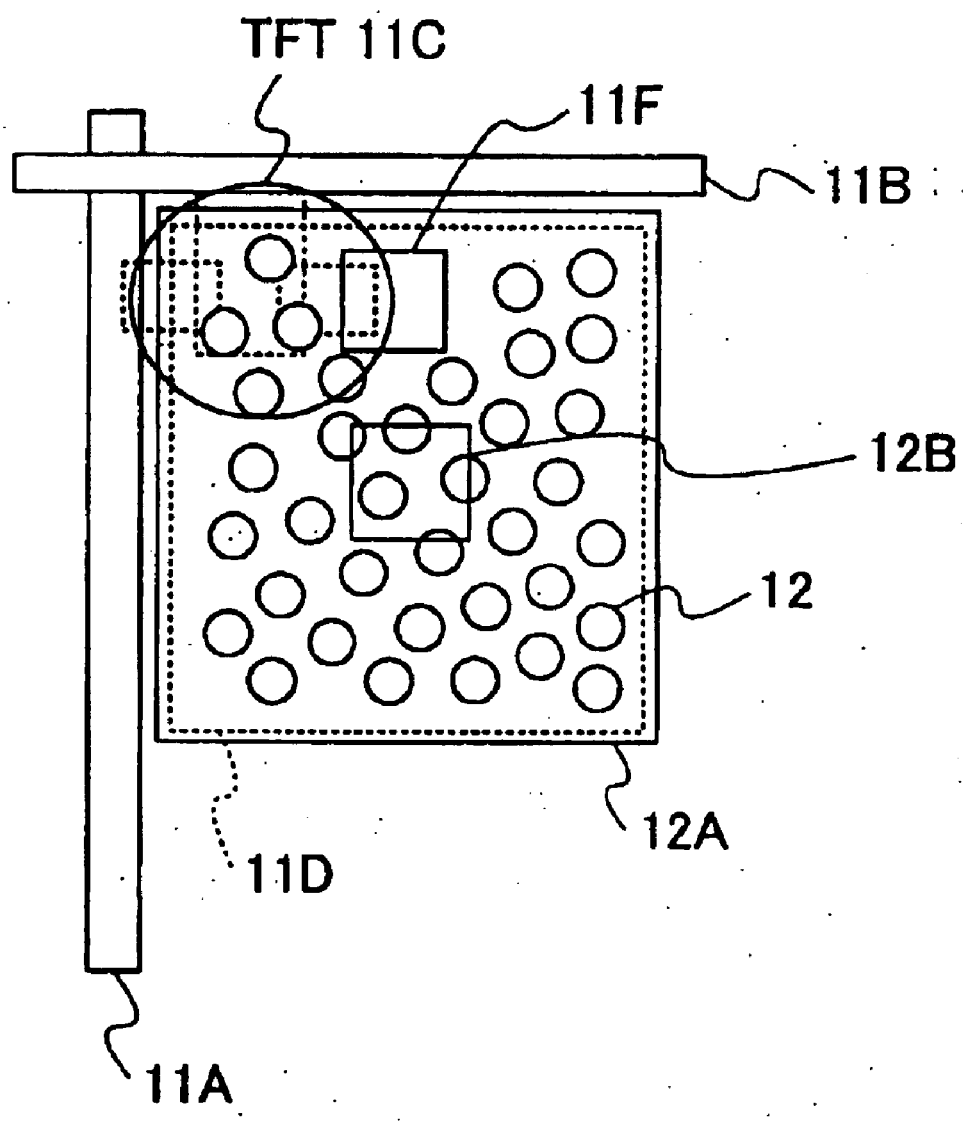
FIG. 4 is a diagram showing the construction of a comparative experiment of the reflection-type VA-mode liquid crystal display device.

Thus, in a structure such as the one shown in FIG. 4 in which the alignment control structure 12B is formed at the central part of the pixel region and the contact hole 11F is formed in the vicinity of a TFT 11C provided at the peripheral part of the pixel region, it is inevitable that there are formed plural regions of low reflectivity in the pixel region when viewed in the direction perpendicular to the substrate 14. In such a structure, the brightness of the image representation is deteriorated seriously.

In the case of the liquid crystal display device 10 of FIGS. 1 and 2, on the other hand, the alignment control structure 12B coincides with the contact hole 11F when viewed in the direction perpendicularly to the substrate 14, and the degradation of reflectivity is suppressed minimum.

Further, as can be seen from the cross-sectional view of FIG. 2, there is formed a depression in the region of the contact hole 11F in correspondence to the projecting alignment control structure 12B, such that the depression has a lateral size and a width respectively corresponding to a lateral size and a width of the alignment control structure 12B. As a result, substantially the same cell thickness is maintained also in such a region where the projecting alignment control structure 12B is formed.

Next, fabrication process of the reflection-type liquid crystal display device 10 of FIGS. 1 and 2 will be explained.

In the present embodiment, a substrate produced for a transmission-type liquid crystal display device is used for the TFT substrate 11, and thus, the TFT substrate 11 carries thereon the TFT 11A, the gate electrode 11B, the date electrode 11C and the transparent pixel electrode 11D. The TFT substrate 11 is then formed with a resist layer by applying a positive resist film by a spin-coating process with a thickness of about 1.2 $\mu$m such that the positive resist film covers the TFT 11A, the gate electrode 11B, the date electrode 11C and the transparent pixel electrode 11D.

The resist layer thus formed has a flat surface, and ultraviolet irradiation process is conducted, after applying a prebaking process at 90° C. for 30 minutes, for forming the projection and depression pattern 12 by using a mask, except for the central part of the pixel region, in which the contact hole is to be formed.

By developing the resist layer thus exposed, followed by conducting a final baking process at 200° C. for 60 minutes, the projection and depression pattern 12 is formed.

The projection and depression pattern 12 thus formed is then coated with an Al film by conducting an evaporation deposition process, and the reflection electrode 12A for the pixel region is formed by patterning the Al film thus formed by applying a photolithographic process.

Next, formation of the alignment control structure 12B will be explained.

First, a positive photosensitive transparent resin layer having a dielectric constant of 3.2 is applied to the substrate 14 with a thickness of about 1.2 $\mu$m by a spin coating process so as to cover the electrode 14A.

Next, the resin layer thus formed is subjected to a prebaking process at 90° C. for 30 minutes, followed by an ultraviolet exposure process that uses a mask. Further, by consecutively conducting a developing process, a post-exposure process, a first baking process at 130° C. for 2 minutes, and further a final baking process at 220° C. for 6 minutes, the foregoing alignment control structure 12B is formed at the central part of the pixel region.

Further, vertical alignment films 12C and 12D each containing a side chain diamine are applied respectively on the surface of the TFT substrate 11 and the opposing substrate 13 such that the vertical alignment film 12C covers the projection and depression pattern 12 and the reflection electrode 12A and such that the vertical alignment film 12D covers the electrode 14A and the alignment control structure 12B.

Next, the substrates 11 and 14 thus prepared are stacked with each other via a spacer having a diameter of 3 $\mu$m therebetween, and a liquid crystal having a negative dielectric anisotropy ($\Delta\epsilon=-3.5$) characterized by a refractive index difference $\Delta n$ between the extraordinary ray and the ordinary of 0.067 is injected into the gap formed between the substrates 11 and 14. Thereby, a liquid crystal panel of vertical alignment mode is formed.

Further, by stacking the TAC film 15, the ¼ wavelength film 16 and the polarizer 17 consecutively on the outer surface of the substrate 14, the fabrication process of the reflection-type liquid crystal display device 10 is completed.

Figure 5:
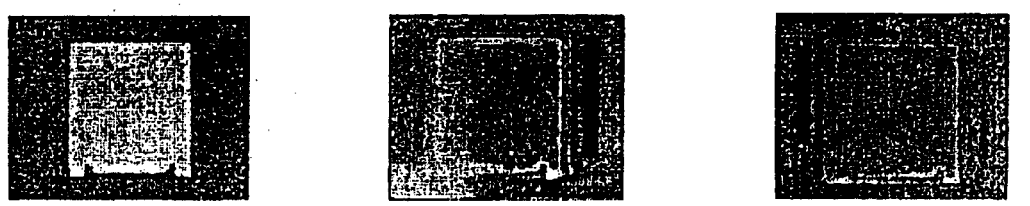
FIG. 5 is a diagram showing an example of black representation mode in the reflection-type liquid crystal display device of FIG. 1.

FIG. 5 is a diagram showing the state of the black representation mode in the liquid crystal display device 10 of the present embodiment for the case the proportion of the vertical alignment component (side chain diamine) in the vertical alignment films 12C and 12D with regard to the entire amine component is set to 5%, 10% and 25%.

Referring to FIG. 5, it can be seen that there is caused an extensive leakage of light in the case the proportion of the vertical alignment component in the vertical alignment film is set to 5% or 10%, and associated with such a leakage of light, there is caused the problem of degradation of contrast ratio.

On the other hand, in the case the proportion of the vertical alignment component in the alignment films 12C and 12D is 25%, it can be seen that there is little leakage of light. Thus, from the result of FIG. 5, it is concluded that the proportion of the vertical alignment component in the vertical alignment films 12C and 12D should be preferably set to 25% or more.

Generally, leakage of light is caused whenever the liquid crystal molecule is tilted however small the tilt angle may be. However, it is thought that recognition of such light leakage by human beings occurs when the tilt angle of the liquid crystal molecules has exceeded a certain threshold.

In the case of a transmission-type liquid crystal display device in which no projections or depressions are formed on the surface, a sufficient contrast ratio is achieved when the proportion of the vertical alignment component in the molecular orientation film is 5%. On the other hand, the result of FIG. 5 shows that a sufficient contrast ratio cannot be secured in the reflection-type liquid crystal display device unless the proportion of the vertical alignment component in the alignment film is set to be 25% or more.

Table 1 below explains the reflectivity (brightness) and contrast ratio obtained for the white representation mode in the reflection-type liquid crystal display device 10 as viewed in the direction perpendicular to the liquid crystal panel, in comparison with the result for the reflection-type liquid crystal display devices according to comparative experiments 1 and 2 (Comparative 1, Comparative 2), wherein the measurement of Table 1 is conducted by using an integrating sphere optical source. In the comparative experiment 1, on the other hand, the reflection-type liquid crystal display device uses an oblique slit in the opposing electrode 14A in place of the alignment control structure 12B while in the comparative experiment 2, the reflection-type liquid crystal display device uses an alignment control structure similar to the alignment control structure 12B on the substrate 14 but with a height of 2.0 μm.

TABLE 1

|  | VA component % | brightness % | contrast |
|---|---|---|---|
| Embodiment 1 | 5 | 13 | 2.6 |
|  | 10 | 13 | 11.0 |
|  | 25 | 13 | 23.0 |
|  | 50 | 13 | 23.3 |
| Comparative 1 | 50 | 10 | 17.7 |
| Comparative 2 | 50 | 12 | 21.2 |

Referring to Table 1, it can be seen that the reflection-type liquid crystal display device 10 of the present embodiment achieves brightness superior to the liquid crystal display device of any of the comparative experiments 1 and 2, although the proportion of the vertical alignment component (side chain diamine) with regard to the total diamine component is changed in the range of 5–50% in the present embodiment. Further, it can be seen that a contrast ratio of 23.0 or more is achieved by setting the proportion of the vertical alignment component to be 25% or more.

Considering the fact that a TN-mode reflection-type liquid crystal display device can provide brightness of only about 13% and contrast ration of 18 in the maximum, it will be understood that the reflection-type liquid crystal display device 10 of the present embodiment can provide much superior performance as compared with such a TN-mode reflection-type liquid crystal display device.

In Table 1, it is noted that the brightness of the white representation mode is reduced by about 30% in the case of the reflection-type liquid crystal display device of the comparative experiment 1 over the reflection-type liquid crystal display device 10 of the present embodiment. It is believed that this result is caused by the effect that the liquid crystal molecules in the vicinity of the slit formed in the opposing electrode does not cause switching.

In the comparative experiment 2, it is also noted that the achieved brightness is smaller than the brightness achieved by the present embodiment by about 8%. It is believed that this has been caused as a result of reduced retardation of the liquid crystal layer in the part located on the alignment structure. It should be noted that the alignment structure in the comparative experiment 2 is has a height larger than the alignment structure used in the present embodiment.

Figure 6:
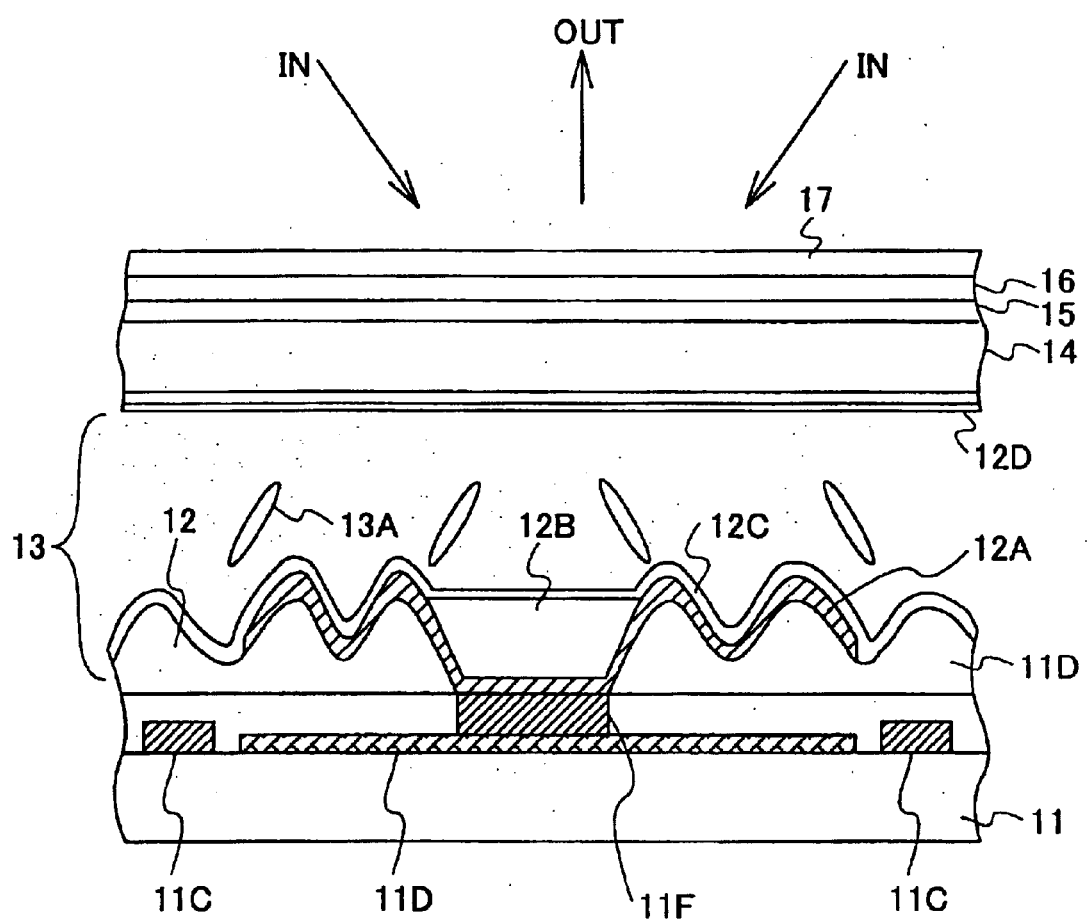
FIG. 6 is a diagram showing a modification of the reflection-type liquid crystal display device of FIG. 1.

In the reflection-type liquid crystal display device 10 of the present embodiment, it is also possible to form an alignment control structure 12B, in the case a material having a dielectric constant larger than the dielectric constant of the liquid crystal layer 13 is used for the alignment control structure 12B, such that the alignment control structure 12B fills the depression formed on the side of the TFT substrate 11 in correspondence to the conductive plug 11F as represented in FIG. 6. According to such a construction, it is also possible to realize the molecular alignment of the liquid crystal molecules tilting toward the center of the pixel region.

[Second Embodiment]

Next, explanation will be made on a reflection-type liquid crystal display device 20 according to a second embodiment of the present invention.

Figure 7:
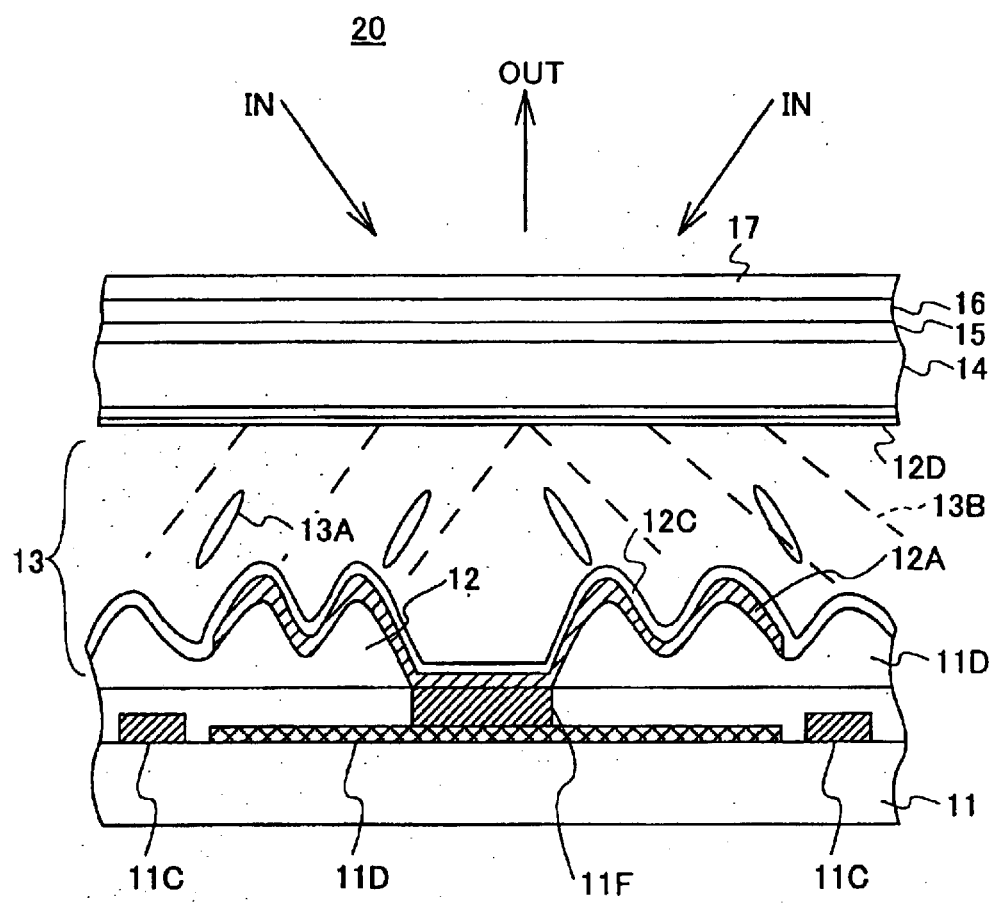
FIG. 7 is a cross-sectional diagram showing the construction of a reflection-type liquid crystal display device according to a second embodiment of the present invention.

FIG. 7 shows the construction of the reflection-type liquid crystal display device 20 wherein those parts corresponding to the parts described previously are designated by the same reference numerals and the description thereof will be omitted.

Referring to FIG. 7, the reflection-type liquid crystal display device 20 has a construction somewhat similar to that of the reflection-type liquid crystal display device 10 explained previously, except that the alignment control structure 12B is removed from the substrate 11 or 14.

Instead, there are formed polymer chains 13B having an orientation in the liquid crystal layer 13 in the liquid crystal display device 20 of the present embodiment, wherein the polymer chains 13B function so as to cause tilting of the liquid crystal molecules 13A toward the central part of the pixel region. In FIG. 7, it should be noted that the reference numeral 13B merely represents the polymer chains schematically and is not intended to depict the actual structure of the polymer chains or indicate individual polymer chains.

Figure 8:
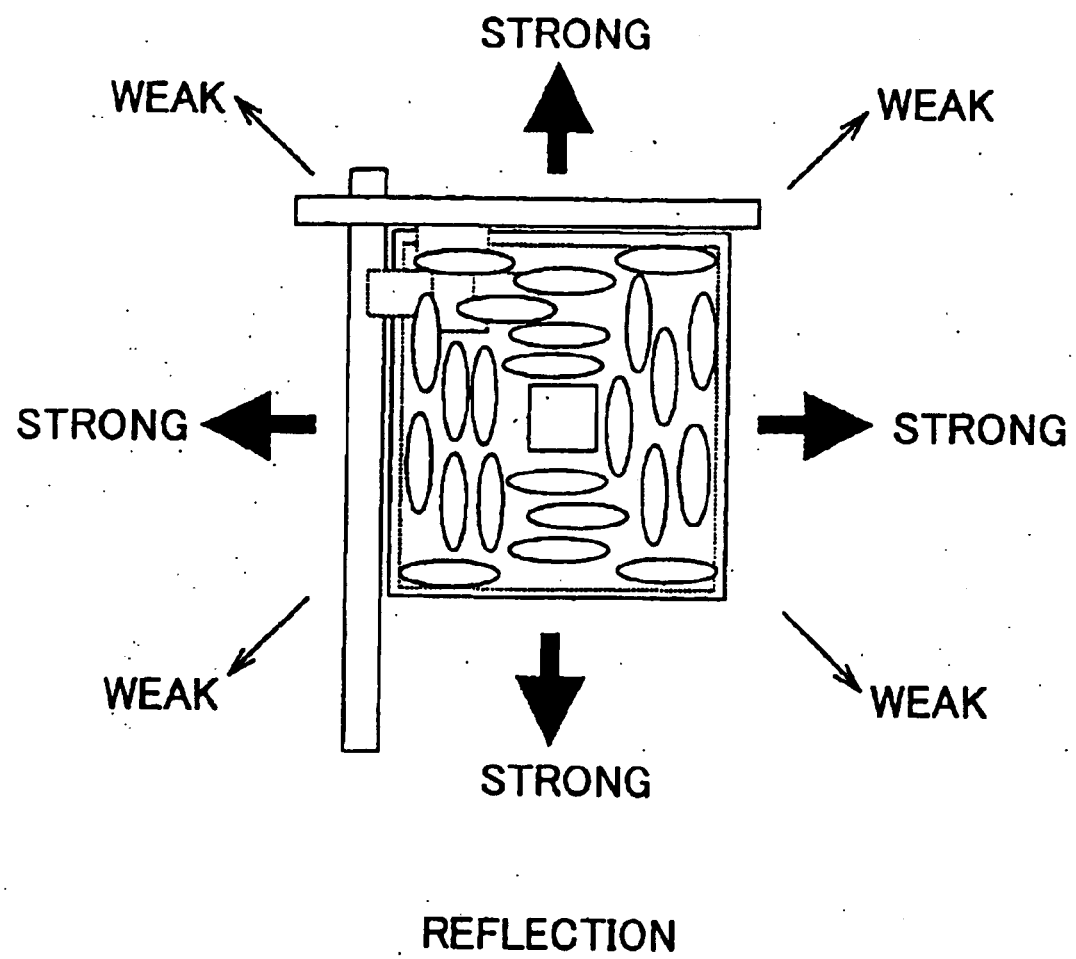
FIG. 8 is a diagram showing the directivity of the reflection light formed in the reflection-type liquid crystal display device of FIG. 7.

In more detail, the projection and depression pattern 12 is formed on the TFT substrate 11 in the present embodiment in the form of an elongated pattern such that each projection pattern extends in the longitudinal direction or lateral direction of the substrate as represented in FIG. 8. Further, the alignment films 12C and 12D are formed by using a vertical alignment film containing the vertical alignment component with a proportion of 25%.

Referring to FIG. 8, the projections and depressions in the projection and depression pattern 12 are formed in each of the domain regions A–D schematically represented in FIG. 3, wherein each of the projections or depressions extends in the longitudinal direction or lateral direction along the outer peripheral edge of the regions A–D.

Further, the substrate 11 and the substrate 12 are stacked with each other via a spacer having a diameter of 3 μm, and a liquid crystal admixed with a resin forming a polymer chain upon ultraviolet irradiation is injected into the gap formed between the substrates 11 and 14. The liquid crystal may contain the resin with a proportion of 0.3% by weight.

With this, the liquid crystal layer 13 is formed. In the present embodiment, a resin that causes photo-polymerization upon irradiation of ultraviolet radiation (I-line) with the intensity of 2000 mJ/cm$^2$ or more is used.

Figure 9:
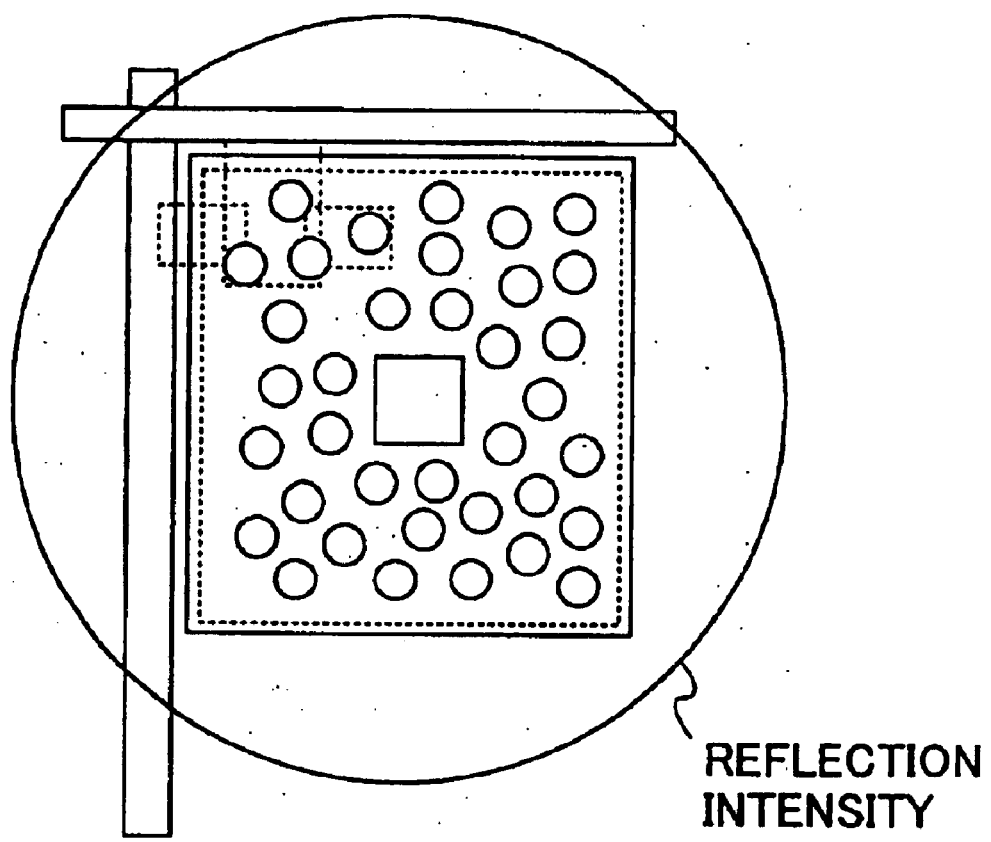
FIG. 9 is a diagram showing the directivity of the reflection light formed in the reflection-type liquid crystal display device of FIG. 1.

In the reflection-type liquid crystal display device thus formed, it will be noted that the intensity of the reflection light formed by the projections and depressions in the projection and depression pattern 12 increases in the longitudinal direction and in the lateral direction of the substrate as represented in FIG. 8, by forming the laterally or longitudinally elongating projection and depressions on the TFT substrate 11. In the projection and depression pattern 12 of FIG. 1, on the other hand, no such a directivity appears in the reflected light as represented in FIG. 9.

Thus, in the present embodiment, a drive voltage of 4V is applied to the liquid crystal display device thus obtained, and ultraviolet radiation is applied to the substrate 14 in this state such that the intensity of the reflected light, reflected by the projection and depression pattern 12 becomes 2000 mJ/cm$^2$ or more in the liquid crystal layer 13 in the longitudinal direction and in the lateral direction. As a result of the action of the reflected light formed from the ultraviolet radiation in the longitudinal direction and lateral direction, there are formed polymer chains 13B in the liquid crystal layer 13 extending in the longitudinal and lateral directions of the substrate, and the liquid crystal molecules 13A in the liquid crystal layer 13 are aligned as represented in FIG. 2 as a result of the action of the vertical alignment films 12C and 12D and further the polymer chains 13B thus formed.

The measurement of brightness and contrast ratio conducted on the reflection-type liquid crystal display device thus formed revealed similar results as in the case of the reflection-type liquid crystal display device 10 of the previous embodiment.

According to the present embodiment, it is possible to polymerize a photo-polymerizable compound in an arbitrary direction in which the optical intensity becomes maximum, by controlling the shape of the projection and depression pattern 12 reflecting the ultraviolet radiation and by incorporating the photo-polymerizable compound into the liquid crystal layer 13.

[Third Embodiment]

Figure 10:
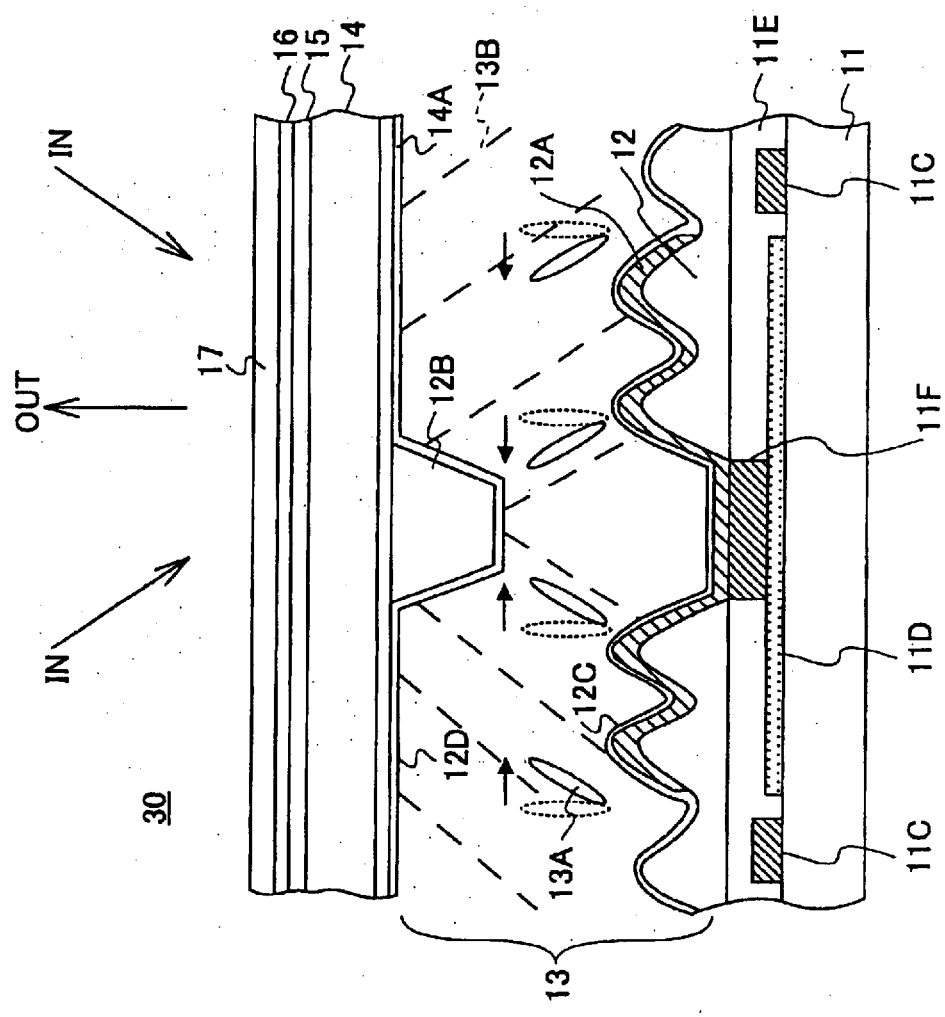
FIG. 10 is a diagram showing the cross-sectional structure of a reflection-type liquid crystal display device according to a third embodiment of the present invention.

FIG. 10 shows the construction of a reflection-type liquid crystal display device 30 according to a third embodiment of the present invention, wherein those parts corresponding to the parts described previously are designated by the same reference numerals and the description thereof will be omitted.

Referring to FIG. 10, the liquid crystal display device has a construction mixing the features of the first embodiment and the second embodiment in that the glass substrate 14 carries thereon the alignment control structure 12B and that the projections in the projection and depression pattern 12 have an elongated form extending in the longitudinal or lateral direction of the substrate as represented in FIG. 8. Further, the liquid crystal layer 13 includes therein the optically polymerized chains 13B.

In the liquid crystal display device 30 of FIG. 10, it should be noted that the absorption axis of the polarizer 17 is set in the longitudinal direction of the substrate and the direction of the retardation axis of the ¼ wavelength film 16 is set to form an angle of 45 degrees with respect to the absorption axis of the polarizer 17.

Table 2 below compares the brightness and contrast ratio obtained for the reflection-type liquid crystal display device 30 thus obtained in the white representation mode with the brightness and contrast ratio obtained for a similar reflection-type liquid crystal display device (comparative example 3: Comparative 3), in which the direction of the absorption axis of the polarizer 17 is offset from the longitudinal direction of the substrate by 45 degrees.

TABLE 2

|  | VA component % | brightness % | contrast |
| --- | --- | --- | --- |
| Embodiment 3 | 25 | 13 | 24.8 |
| Comparative 3 | 25 | 13 | 23.0 |

Referring to Table 2, it will be noted that there is no substantial change with regard to brightness between the present embodiment and the comparative experiment, while it will also be noted that there is an improvement of contrast ratio in the liquid crystal display device of the present embodiment.

It is believed that this improvement is achieved as a result of improvement of the black representation mode, which in turn is caused as a result of setting the absorption axis of the polarizer 17 in the direction in which the reflection intensity of the projection and depression pattern 12 becomes maximum.

[Fourth Embodiment]

Figure 11:
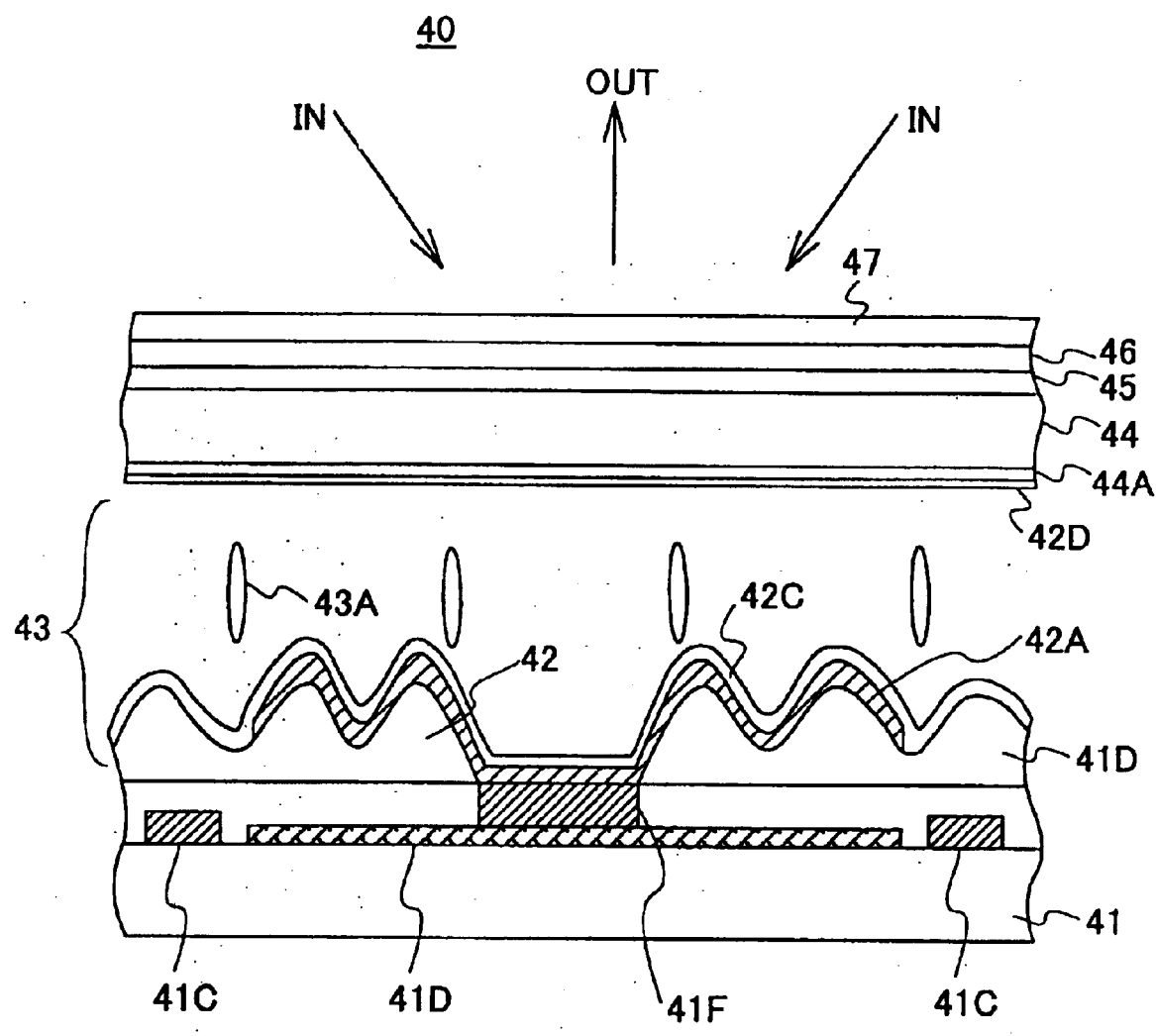
FIG. 11 is a diagram showing the cross-sectional structure of a reflection-type liquid crystal display device according to a fourth embodiment of the present invention.

FIG. 11 shows the construction of a reflection-type liquid crystal display device 40 according to a fourth embodiment of the present invention while FIG. 12 shows the propagation of rays in the reflection-type liquid crystal display device 40 of FIG. 11. In FIG. 12, it should be noted that only those parts related to the optical path length of the optical rays is represented and representation of other parts are omitted.

Referring to FIG. 11, the liquid crystal display device 40 of the present embodiment is generally formed of a lower glass substrate 41, an upper glass substrate 44 facing the lower glass substrate 41 and a liquid crystal layer 43 having a negative dielectric anisotropy confined between the upper and lower glass substrates 41 and 44, wherein the lower glass substrate 44 carries thereon elements such as a TFT not illustrated, a gate electrode 41C cooperating with the TFT, and further a data electrode not illustrated. A standard TFT substrate designed for a transmission-type liquid crystal display device can be used for the glass substrate 44. In this case, a pixel electrode 41D of a transparent conductor such as ITO is formed on the glass substrate 41 in the state connected to the TFT electrically.

It should be noted that the TFT, the gate electrode 41C and the date electrode are covered by an insulating film such as a resin, and there is formed a projection and depression pattern 42 on the insulating film 41E by patterning and processing a resist film.

The projection and depression pattern 42 is covered by a reflection electrode 42A of Al and the like, and the reflection electrode is connected to the pixel electrode 41D via a contact hole 41F formed in the insulation film 41E preferably at the central part of the pixel region.

On the upper glass substrate 44, there is formed an opposing electrode 44A uniformly and continuously at the surface of the substrate 44 facing the substrate 41.

Further, there is formed a vertical alignment film 42C on the substrate 41 so as to cover the projection and depression pattern 42 and the reflection electrode 42A and another vertical alignment film 42D is formed on the substrate 44 so as to cover the opposing electrode 44A.

In the non-activated state in which there is no drive electric field applied to the liquid crystal layer 43, the alignment films 42C and 42D act to align the liquid crystal molecules in the direction generally perpendicular to the substrate 41 or 44, while the liquid crystal molecules contacting the projection and depression pattern 42 cause tilting as represented in FIG. 12 because of the existence of the projection and depression pattern 42.

Further, a phase compensation film 45 preferably formed of a TAC film is formed on the outer side of the substrate 44, and a ¼ wavelength film 46 and a polarizer 47 are laminated consecutively further on the compensation film 45.

In the reflection-type liquid crystal display device 40 of the present embodiment, it should be noted that the liquid crystal molecules 43A constituting the liquid crystal layer 43 is not limited to the one having a negative dielectric anisotropy but also may be the one having a positive dielectric anisotropy. Even in such a case, the liquid crystal display device 40 is a reflection-type liquid crystal display device because of the fact that the liquid crystal molecules 43A are aligned in the direction generally perpendicular to the plane of the substrate 41 or 44 in the non-activated state thereof.

In the reflection-type VA-mode liquid crystal display devices 10–30 explained in the preceding embodiments, it should be noted that the liquid crystal layer 13 shows a retardation also in the non-activated state of the device in view of the fact that the environmental light impinges obliquely to the liquid crystal layer 13 and in view of the fact that the liquid crystal molecules 13A are tilted by the projection and depression pattern 42. Thus, the desired ideal black representation cannot be achieved in the non-activated state of the foregoing reflection-type VA-mode liquid crystal display device, unless the retardation of the liquid crystal layer 13 in the non-activated state is compensated for by the phase compensation film and the like.

In the case of a transmission-type VA-mode liquid crystal display device, there is already a proposal of the technology for compensating for the retardation of a vertically aligned liquid crystal layer by using a phase compensation film in the British Patent 1462978 or in the Japanese Laid-Open Patent Publication 10-153802.

In these proposals, the retardation of a phase compensation film given as $df \cdot \{(n_x+n_y)/2-n_z\}$ is set to be generally equal to the retardation of the liquid crystal layer defined as $dlc \cdot \Delta n$, wherein df represents the thickness of the phase compensation film, $n_x$, $n_y$ and $n_z$ respectively represent the refractive indices of the phase retardation film in the x-, y- and z-directions, dlc represents the thickness of the liquid crystal layer, and $\Delta n$ represents the refractive index difference between the extraordinary ray and the ordinary ray in the liquid crystal layer.

In such a technology of transmission-type VA-mode liquid crystal display device, the phase compensation film is used merely for blocking the light incident obliquely in the black representation mode and for improving the viewing angle, and the desired compensation of the black representation mode is not attained when applied to a reflection-type VA-mode liquid crystal display device.

It should be noted that a reflection-type VA-mode liquid crystal display device having projections and depressions on a reflection surface is designed so as to incorporate as much environmental light as possible and reflect the incorporated environmental light toward the observer.

Referring to FIG. 12, the environmental light incident obliquely with an incident angle θ1 is refracted with a refraction angle θ2 determined by the refractive index ratio between the air and the phase compensation film and impinges into the liquid crystal layer 43 with an incident angle θ3.

At the interface between the liquid crystal layer 43 and the substrate 44, the liquid crystal molecules 43A are controlled the alignment state thereof by the vertical alignment film 42D not illustrated in FIG. 12 in the direction generally perpendicular to the plane of the substrate 44. Because of this, the incident light hits the liquid crystal molecule 43A with the angle of θ3 in the vicinity of the interface between the liquid crystal layer 43 and the substrate 44. Here, it should be noted that the refractive index of the liquid crystal layer is about 1.5 and is approximately identical to the refractive index of the phase compensation film 45. Because of this, it is possible to regard that the incident angle θ3 is nearly equal to the incident angle θ2.

On the other hand, in such a reflection-type VA-mode liquid crystal display device, it is necessary to emit the obliquely incident environmental light in the direction perpendicularly to the substrate 44 as explained with reference to preceding embodiments, and for this purpose, there is formed the projection and depression pattern 42 on the TFT substrate 41.

In FIG. 12, such a projection and depression pattern 42 is approximated by a cone having a cross-section of an isosceles triangle. Thus, on the projection and depression pattern 42, the liquid crystal molecules 43A are aligned perpendicularly to the oblique edge of the triangle that forms an angle ζ with regard to the plane of the substrate 41 as a result of the function of the vertical alignment film 42C covering the projection and depression pattern 42.

Thus, in the liquid crystal layer 43, the liquid crystal molecules 43A increases the tilt angle gradually in the thickness direction of the liquid crystal layer 43 from the value of 0 at the interface between the liquid crystal layer 43 and the substrate 44 to the value of ζ at the interface between the liquid crystal layer 43 and the projection and depression pattern 42. Thus, in the vicinity of the interface between the liquid crystal layer 43 and the substrate 41, the incident angle of the light impinging to the liquid crystal molecule 43A is decreased from the foregoing angle θ3 by the angle ζ because of the tilt caused in the liquid crystal molecule 43A by the projection and depression pattern 43A.

Thus, the incident light entering into the liquid crystal layer 43 from the phase compensation film 45 hits the projection and depression pattern 42 with an incident angle ζ and reflected also with a reflection angle ζ. As a result, the reflected light again hits the liquid crystal molecule 43A aligned perpendicularly on the projection and depression pattern 42 with an incident angle ζ.

At the interface between the liquid crystal layer 43 and the substrate 41, the alignment direction of the liquid crystal molecules is controlled perpendicularly to the plane of the substrate 41. Thus, the liquid crystal molecules 43A change the alignment direction in the thickness direction of the liquid crystal layer 43 gradually from the substrate 41 to the substrate 44. Associated with this, the incident angle of the reflection light incident to the liquid crystal molecules 43A is reduced gradually and becomes zero at the interface to the substrate 44.

In the optical system of FIG. 12, the optical path length within the phase compensation film 45 in the first half part of the optical path, defined as the optical path of the incident light reaching the projection and depression pattern 42, is given as dv/cos θ2, wherein this optical path length is approximated to be equal to dv/cos 2ζ in view of the relationship θ2≈θ3 (dv/cos θ2≈dv/cos 2ζ). Further, the optical path length of the incident light in the liquid crystal layer 13 is given as dlc/cos 2ζ. On the other hand, the optical path length of the reflection light reflected vertically to the principal plane of the substrate 41 by the projection and depression pattern 42 is given as dlc in the liquid crystal layer and dv in the phase compensation film 45.

Thus, in the case of the reflection-type VA-mode liquid crystal display device 40 in which the environmental light enters obliquely, it will be noted that there is caused a retardation even in the non-activated state of the liquid crystal display device because of the different optical path lengths between the incoming optical path and outgoing optical path, and that the magnitude of the retardation depends on the incident angle θ1 and the angle ζ of the projection and depression pattern 42.

In an example in which the liquid crystal layer 43 has a thickness dlc of 3 μm and a refractive index difference Δn of 0.067 and in which the projection and depression pattern 42 provides an average inclination angle <ζ> of 13 degrees, the retardation of the liquid crystal layer 43 in the non-activated state in which no drive voltage is applied to the liquid crystal display device is calculated to be 33 nm as represented in Case A of Table 3 below, provided that the incident angle θ1 of the incident light is set to 25 degrees.

TABLE 3

| reflector | <ζ> | retardation of liquid crystal layer | phase difference ① | compensation |
|---|---|---|---|---|
| A | 13.06 | 33.25 | 15.26 | 45.9% |
| B | 8.98 | 15.98 | 9.05 | 56.6% |
| C | 7.67 | 13.01 | 7.92 | 60.9% |
| D | 7.48 | 11.87 | 7.53 | 63.4% |

| reflector | phase difference ② | compensation |
|---|---|---|
| A | 29.65 | 89.2% |
| B | 16.15 | 101.1% |
| C | 13.71 | 105.4% |
| D | 12.85 | 108.3% |

| reflector | phase difference ③ | compensation |
|---|---|---|
| A | 36.32 | 109.2% |
| B | 19.04 | 119.1% |
| C | 15.94 | 122.5% |
| D | 14.82 | 124.9% |

| reflector | phase difference ④ | compensation |
|---|---|---|
| A | 51.34 | 154.4% |
| B | 25.96 | 162.5% |
| C | 21.42 | 164.6% |
| D | 19.76 | 166.5% |

In Table 3, it should be noted that Cases B, C and D are cited in addition to Case A, wherein Case B represents the case in which the average inclination angle <ζ> is set to 9 degrees, Case C represents the case in which the average inclination angle <ζ> is set to 7.7 degrees, and Case D represents the case in which the average inclination angle <ζ> is set to 7.5 degrees.

In order to compensate for such retardation caused obliquely in the liquid crystal layer 43, it is possible to use a film having a negative dielectric anisotropy in the direction perpendicular to the substrate.

Thus, Table 1 further shows the retadation value in the oblique direction and the efficiency of compensation for those cases in which the phase compensation film 45 has a refractive index difference $\{(n_x+n_y)/2-n_z\}$ of 0.0006 (phase difference ①), 0.0013 (phase difference ②), 0.0017 (phase difference ③) and 0.0024 (phase difference ④).

Next, compensation of the oblique retardation achieved by using such a phase compensation film 45 having a negative dielectric anisotropy will be explained.

Figure 13A:
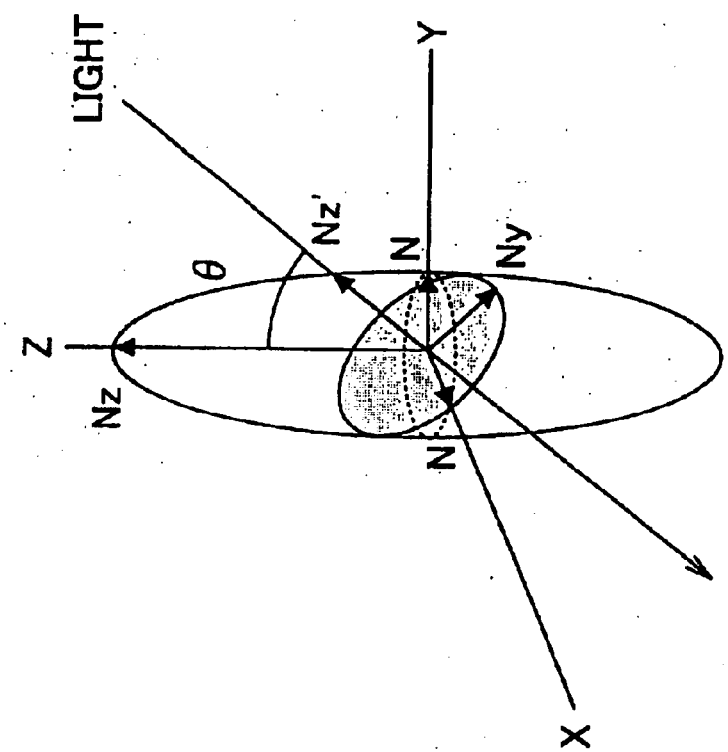
FIGS. 13A and 13B are diagrams showing examples of refractive index ellipsoid respectively for the phase compensation film and liquid crystal layer used in the reflection-type liquid crystal display device of FIG. 12.
Figure 13B:
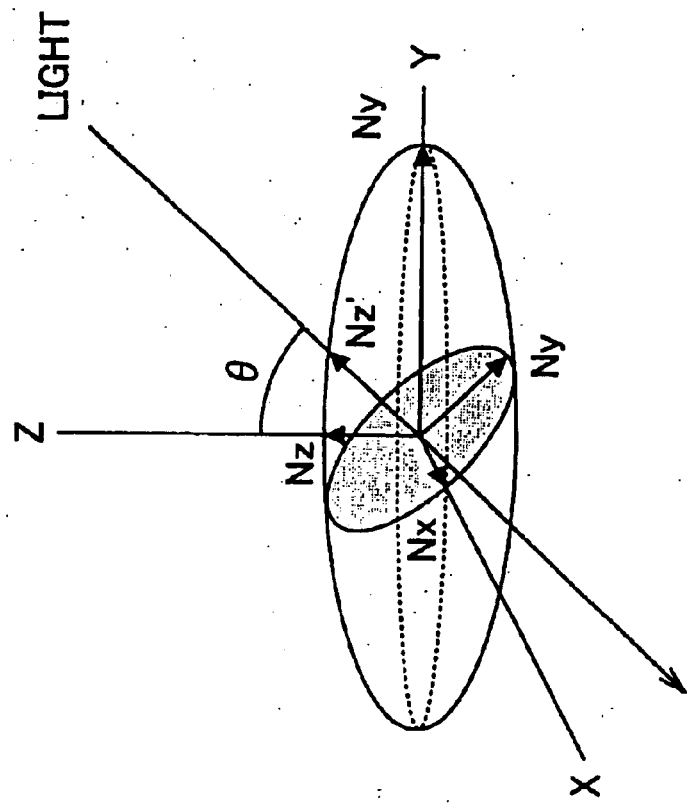
Figure 14A:
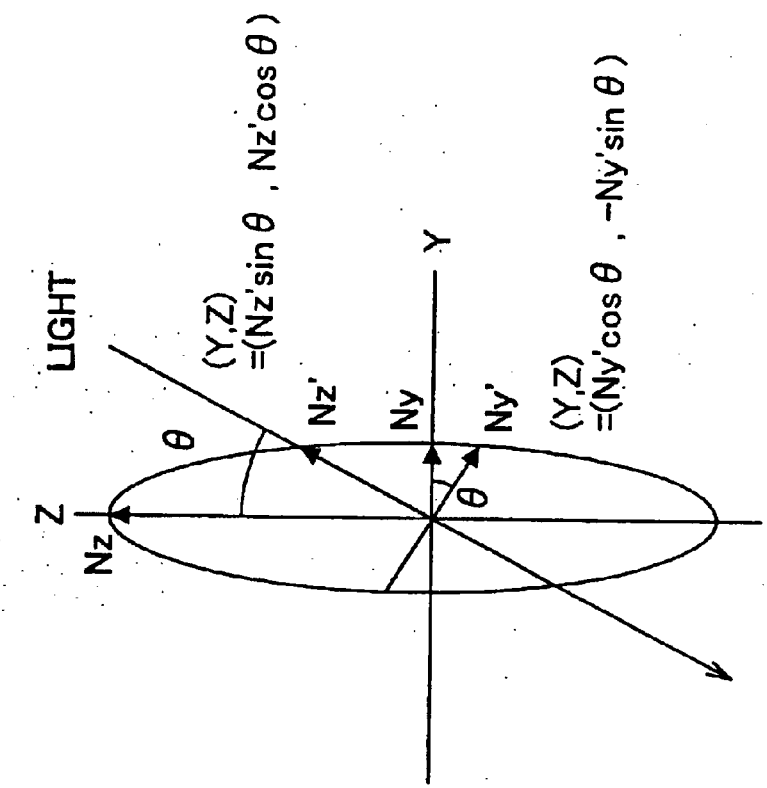
FIGS. 14A and 14B are diagrams showing the cross-sections of the refractive indices ellipsoid of FIGS. 13A and 13B, respectively.
Figure 14B:
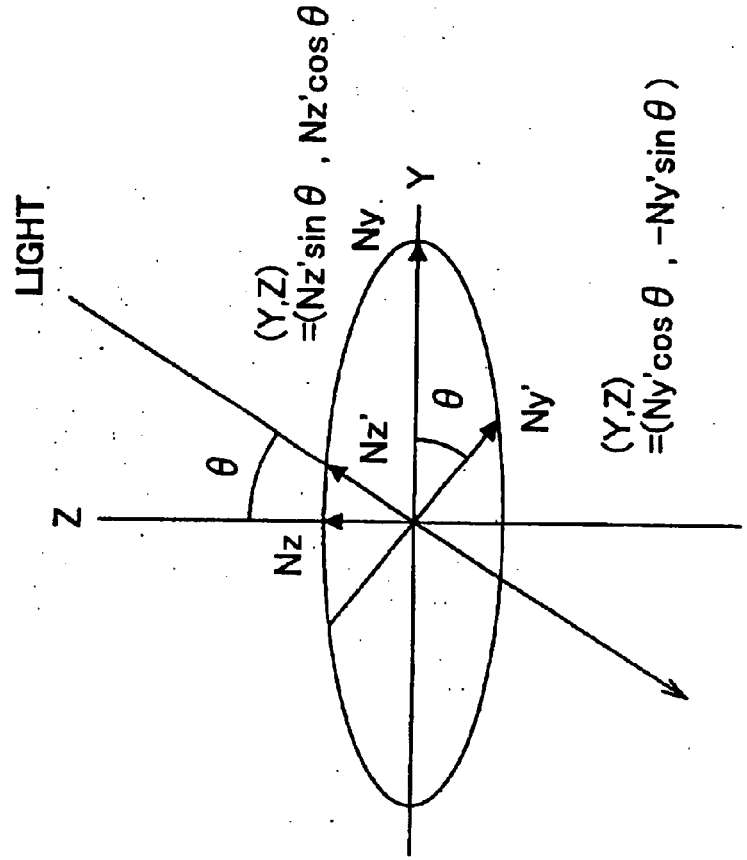

FIG. 13A shows a refractive index ellipsoid of the phase compensation film 45 having a negative dielectric anisotropy in the vertical direction of the substrate while FIG. 13B shows a refractive index ellipsoid of the liquid crystal layer 43 that has a positive dielectric anisotropy. Further, FIG. 14A shows a cross-section of the refractive index ellipsoid of FIG. 13A taken in the Y-Z plane, while FIG. 14B shows a cross-section of the refractive index ellipsoid of FIG. 13B taken in the Y-Z plane. In the discussion hereinafter, it is assumed that there is no in-plane anisotropy in any of the phase compensation film 45 and the liquid crystal layer 43 ($n_x=n_y$).

Referring to FIGS. 13A and 13B and further with reference to FIGS. 14A and 14B, it will be noted that the refractive indices of the ordinary ray and extraordinary ray of the light incident to an X-Y plane with an incident angle θ correspond to the major axis and the minor axis in the case of the phase compensation film 45 and to the minor axis and the major axis in the case of the liquid crystal layer 43, of an ellipse that formed at the cross section of the refractive index ellipsoid sectioned by a plane Referring to FIGS. 14A and 14B, the apparent refractive indices $n_y'$ and $n_z'$ respectively representing the refractive indices in the Y- and Z-directions for the case the incident light has impinged with an angle θ with respect to the normal direction of the substrate (Z-direction), are obtained according to the following equations.

$$\frac{Y^2}{n_y^2} + \frac{Z^2}{n_z^2} = 1$$

$$\frac{n_y'^2 \cos^2 \theta}{n_y^2} + \frac{n_y'^2 \sin^2 \theta}{n_z^2} = 1$$

$$n_y'^2 = \frac{1}{\frac{\cos^2 \theta}{n_y^2} + \frac{\sin^2 \theta}{n_z^2}}$$

$$n_y'^2 = \frac{n_y n_z}{\sqrt{n_z^2 \cos^2 \theta + n_y^2 \sin^2 \theta}} = \frac{n_z}{\sqrt{\frac{n_z^2}{n_y^2} \cos^2 \theta + (1 - \cos^2 \theta)}} = \frac{n_z}{\sqrt{1 - \upsilon \cos^2 \theta}}$$

wherein $$\upsilon = \frac{n_y^2 - n_z^2}{n_y^2}.$$

$$\frac{Y^2}{n_y^2} + \frac{Z^2}{n_z^2} = 1$$

$$\frac{n_z'^2 \sin^2 \theta}{n_y^2} + \frac{n_z'^2 \cos^2 \theta}{n_z^2} = 1$$

$$n_z'^2 = \frac{1}{\frac{\sin^2 \theta}{n_y^2} + \frac{\cos^2 \theta}{n_z^2}}$$

$$n_z^2 = \frac{n_y n_z}{\sqrt{n_z^2 \sin^2 \theta + n_y^2 \cos^2 \theta}} = \frac{n_z}{\sqrt{\frac{n_z^2}{n_y^2}(1 - \cos^2 \theta) + \cos^2 \theta}}$$

$$= \frac{n_z}{\sqrt{\frac{n_z^2}{n_y^2} - \upsilon \cos^2 \theta}}.$$

The retardation values of the liquid crystal layer and the phase compensation film and the values of the efficiency of compensation represented in Table 3 above were calculated based on the apparent refractive indices $n_x'$, $n_y'$ and $n_z'$ as well as the incident angle θ, and thus, incorporates the effect of oblique path of the incident light.

Referring to Table 3 again, it can be seen that the phase compensation films ① and ④ cannot provide sufficient compensation, while the phase compensation films ② and ③ can provide near 100% compensation.

It should be noted that such compensation of retardation changes with the retardation $dlc \cdot \Delta n$ of the liquid crystal layer, and thus, the retardation compensation has to be changed when the retardation of the liquid crystal layer is changed.

Generally, the value of retardation is represented by the value in the direction parallel to or perpendicular to the substrate. Thus, it is preferable to represent the retardation of the phase compensation film also in terms of the value parallel to or perpendicular to the substrate, not by the value oblique to the substrate.

Thus, the preferable retardation value obtained as noted above is represented for the case of the reflector A having the average inclination angle $\zeta$ of 13 degrees as $$0.5 \leq [df \cdot \{(n_x+n_y)/2-n_z\}]/(dlc \cdot \Delta n) \leq 0.7.$$

Within this range, a conspicuous effect is achieved for the compensation of black representation mode, although there can be a case in which the retardation compensation deviates by about 10% from the optimum value.

In the case of using the reflectors B–D having the average inclination angle $\zeta$ of 7–9 degrees, on the other hand, the liquid crystal layer 43 has a retardation in the range of 11–16 nm in the non-activated state. In such a case, the phase compensation film ② provides the best result. In this case, the preferable range of retardation of the phase compensation film is determined as $$0.4 \leq [df \cdot \{(n_x+n_y)/2-n_z\}]/(dlc \cdot \Delta n) \leq 0.6,$$

including the allowable margin from the optimum value.

Summarizing the foregoing results, it is concluded that the preferable retardation range of the phase compensation film 45 for the reflection-type liquid crystal display device 40 is determined in the range of $$0.4 \leq [df \cdot \{(n_x+n_y)/2-n_z\}]/(dlc \cdot \Delta n) \leq 0.7.$$

When the inclination angle $\zeta$ has decreased below about 7 degrees, the incident angle $\theta 1$ for incorporating the environmental light becomes too small and it becomes difficult to incorporate the environmental light.

In the construction of FIG. 11, it is particularly advantageous to use a TAC film having a retardation of about 10 nm in the in-plane direction and about 50 nm in the normal direction for the phase compensation film 45. With this, substantially ideal black mode compensation is achieved with low cost.

It should be noted that the polarizer 47 generally has a moisture-blocking film of TAC but such a TAC film is disposed between the ¼ wavelength film 46 and the polarizer 47. Thus, no compensation effect comparable to the one achieved by the phase compensation film 45 can be obtained by such a moisture resistance film. This point will be noted later.

In the liquid crystal display device 40 of FIG. 11, the ¼ wavelength film 45 is disposed between the phase compensation film 45 and the polarizer 47, wherein such a ¼-wavelength film shows smaller wavelength dispersion as compared with the liquid crystal layer 43.

Thus, by disposing such a phase compensation film of small wavelength dispersion between the polarizer 47 and the liquid crystal layer 43 and by achieving a 90-degree rotation of the polarization plane, it is possible to realize excellent black mode representation characterized by small wavelength dispersion and hence small leakage of visible light.

By doing so, it is not preferable to dispose the ¼-wavelength film 46, in other words, a second phase compensation film, outside the phase compensation film 45 or a first phase compensation film. It should be noted that the refractive index ellipsoid of the phase compensation film 45 has an azimuth dependence, and the construction that disposes the ¼-wavelength film 46 between the phase compensation film 45 and the liquid crystal layer 43 would results in a situation in which the linearly polarized light passed through the polarizer is compensated. In this case, there can be a problem that a satisfactory compensation is achieved in a specific azimuth angle while no such a satisfactory compensation is achieved in other azimuth angle. Thereby, the overall compensation effect is reduced.

In the case the ¼-wavelength film 46 is formed outside the phase compensation film 45, the phase compensation film 45 compensates for the optical phase of the circularly polarized light passed through the ¼-wavelength film 46, and the effect of the azimuth dependence is eliminated. It should be noted that circularly polarized light is equivalent in all the azimuth directions, and thus, the optical compensation is achieved for all the azimuth directions in this case, even when there is an azimuth dependence on the refractive index ellipsoid of the phase compensation film 45.

Meanwhile, a phase compensation film such as a TAC film 45 has an in-plane retardation axis. Thus, there is caused a problem in that the retardation of the ¼-wavelength film 46 is affected when such a TAC film 45 is laminated with the ¼-wavelength film 46. In the case the ¼-wavelength film 46 and the phase compensation film 45 are laminated in the state that respective retardation axes coincide each other, for example, the retardation value of such a laminated structure in the in-plane direction becomes the sum of the retardation values of the phase compensation film 45 and the ¼-wavelength film 46. In the case they are disposed such that respective retardation axes cross with each other perpendicularly, the retardation becomes the difference between the retardation values of the phase compensation film 45 and the ¼-wavelength film 46.

Thus, in the case an element formed of lamination of a ½-wavelength film and a ¼-wavelength film is used for the ¼-wavelength film 46 for minimizing the wavelength dispersion, there arises a problem that the phase compensation film 45 is included in the laminated structure in the case the in-plane retardation axis of the phase compensation film 45 is offset from the in-plane retardation axis of the ¼-wavelength film 46. Thereby, there can be a possibility that the wavelength dispersion characteristic is affected.

In order to avoid this problem, it is preferable to coincide the in-plane retardation axis of the TAC film forming the phase compensation film 45 with the in-plane retardation axis of the ½-wavelength film or ¼-wavelength film constituting the laminated ¼-wavelength film 46. In this case, there is caused no effect other than increase or decrease of the retardation.

Particularly, it is possible to achieve complete compensation of the black representation by disposing the phase compensation film 45 and the ¼ wavelength film 46 in such a relationship that respective in-plane retardation axes extend parallel with each other and that the sum of the in-plane retardation becomes almost ¼ of the visible wavelength. By doing so, it is possible to suppress the deviation of retardation of the ¼-wavlelength film 46 caused by the in-plane retardation of the ¼-wavelength film 46.

Especially, in the case the ¼-wavelength film 46 is an element of laminated structure as noted before, it is sufficient to align the in-plane retardation axis of the phase compensation film 45 with the in-plane retardation axis of any of the ¼ wavelength film or the ½ wavelength film. Further, adjustment of retardation is conducted such that the sum of the in-plane retardation of the ¼-wavelength film and the phase compensation film 45 becomes equal to ¼ wavelength or such that the sum of the in-plane retardation of the ½-wavelength film and the phase compensation film 45 becomes equal to ½ wavelength. In this case, it is not always true that the sum of the in-plane retardation of the phase compensation film 45 and the laminated ¼-wavelength film 46 becomes equal to ¼ of the visible wavelength. However, a similar effect is achieved when the retardation of one of the phase compensation films in the laminated ¼-wavelength film 46 is adjusted such that the laminated ¼-wavelength film 46 as a whole provides the in-plane retardation equal to ¼ of the visible wavelength.

Next, the fabrication process of the reflection-type liquid crystal display 40 of FIG. 11 will be explained.

In the present embodiment, a resist film is applied on the TFT substrate 41 by a spin coating process with a thickness of about 1 µm and a prebaking process is conducted at 90° C. for 30 minutes. Thereafter, the resist film thus formed is exposed to ultraviolet radiation while using a mask corresponding to the projection and depression pattern. By developing the resist film after exposure, followed by a baking process at 135° C. for 40 minutes and a final baking process at 200° C. for 60 minutes, the projection and depression pattern 42 is formed with the average inclination angle <ζ> of 7.7 degrees. It should be noted that this inclination angle is changed arbitrarily by changing the baking temperature and the baking time.

Further, an Al film 42A is deposited on the surface of the projection and depression pattern 42 thus formed by an evaporation deposition process with a thickness of 200 nm.

Further, the vertical alignment molecular orientation films 42C and 42D are applied to the TFT substrate 41 thus processed and also to the opposing substrate 44, and the substrates 41 and 44 thus processed are assembled together via intervening spacers each having a diameter of 3 µm, and a vacant panel is obtained.

Next, a liquid crystal having a negative dielectric anisotropy (Δε=−3.5) and a refractive index difference Δn of 0.067 between the extraordinary ray and the ordinary ray is injected into the gap formed between the foregoing substrates 41 and 42. With this, a liquid crystal panel is obtained.

Next, two biaxial TAC films having an in-plane retardation of 10 nm and a normal direction retardation of 47 nm are laminated on the substrate 44 as the phase compensation film 45 such that the in-plane retardation axis has an azimuth angle of 85 degrees, and a ¼-wavelength film having an in-plane retardation of 135 nm and a ½-wavelength film having an in-plane retardation of 250 nm are laminated consecutively with the azimuth angle of the retardation axes set to 140 degrees and 85 degrees, respectively. Thereby, the laminated ¼-wavelength film 46 is formed. Further, the polarizer 47 is formed on the ¼-wavelength film 46 such that the absorption axis is oriented in the azimuth direction of 75 degrees.

In the VA-mode reflection-type liquid crystal display device 40 thus formed, it is possible to suppress the wavelength dispersion by using the laminated ¼-wavelength film as the ¼-wavelength film 46. Further, by setting the direction of the in-plane retardation axis of the phase compensation film 45 to be coincident to the in-plane retardation axis of the ½-wavelength film constituting the laminated ¼-wavelength film 46, the value of the in-plane retardation of the ½-wavelength film is reduced by the amount of the in-plane retardation of the phase compensation film 45, and the ¼-wavelength film 46 as a whole shows an in-plane retardation value corresponding to ½ wavelength at the green wavelength (540 nm), in which the sensitivity of human eye is largest.

On the other hand, the phase compensation film 45 is a film having a negative dielectric anisotropy for compensating for the retardation of the liquid crystal layer in the state the electric field is applied, wherein the phase compensation film 45 has an in-plane retardation $df \cdot \{(n_x+n_y)/2-n_z\}$ satisfying the relationship of $$df \cdot \{(n_x+n_y)/2-n_z\}/(dlc \cdot \Delta n) = 0.47$$

with respect to the in-plane retardation $dlc \cdot \Delta n$ of the liquid crystal layer 43.

Table 4 below shows the result of measurement of reflectivity of the reflection-type liquid crystal display device 40 thus obtained for each of the white representation mode and black representation mode by applying a predetermined drive voltage. The measurement of Table 4 was made by using a spectrometer that uses an integrating sphere optical source (Embodiment 4). It should be noted that an integrating sphere optical source is a diffusive optical source emitting light in all angles and all the azimuth directions and can provide illumination close to the environmental light such as interior lighting or sunlight.

TABLE 4

| | | reflectivity | | |
|---|---|---|---|---|
| | orientation | black | white | contrast |
| Embodiment 4 | VA | 0.53 | 12.64 | 24.1 |
| Comparative4 | VA | 0.68 | 12.66 | 18.6 |
| Comparative5 | VA | 0.66 | 12.55 | 18.9 |
| Comparative6 | VA | 0.71 | 12.74 | 18.1 |
| Comparative7 | horizontal | 0.71 | 12.86 | 18.0 |

Referring to Table 4, it can be seen that the reflection-type liquid crystal display device 40 of the present embodiment can achieve the reflectivity of 0.53 at the black representation mode and the reflectivity of 12.64 in the white representation mode. With this, a contrast ratio of 24.1 is realized.

In Table 4, the results of comparative experiments 4–7 (Comparative 4-Comparative 7) are also listed.

In the comparative experiment 4, the order to the phase compensation film 45 and the laminated ¼-wavelength film 46 is reversed, and thus, the substrate 44 is first covered with the ¼-wavelength film of the laminated ¼-wavelength film 46, next with the ½-wavelength film of the laminated ¼-wavelength film 46, and finally the phase retardation film 45 on the foregoing ½-wavelength film. Otherwise, the construction of the liquid crystal display device of the comparative experiment 4 is identical with the one used in Embodiment 4.

In the comparative experiment 5, on the other hand, a liquid crystal display device similar to the one used in Embodiment 4 is used except that the ½-wavelength film constituting the upper layer of the laminated ¼-wavelength film 46 is replaced with a uniaxial film having an in-plane retardation of 270 nm. Further, the ¼-wavelength film in the laminated ¼-wavelength film 46 is disposed such that the retardation axis op the ¼-wavelength film is coincident to the anchoring orientation (rubbing orientation) of the liquid crystal layer. With this, the in-plane retardation is reduced by 20 nm as compared with the ¼-wavelength film of Embodiment 4.

In the comparative experiment 6, on the other hand, the phase compensation film 45 of the liquid crystal display device of Embodiment 4 is eliminated Further, an uniaxial film having an in-plane retardation of 270 nm is used for the ½ wavelength film constituting a part of the laminated ¼-wavelength film.

In the comparative experiment 7, on the other hand, a horizontal alignment film is applied to the substrates 41 and 44, and the substrates 41 and 44 are assembled with each other via spacers having a diameter of 3 µm. Further, a liquid crystal having a positive dielectric anisotropy (Δ∈=6.0) and a refractive index difference Δn between the extraordinary ray and the ordinary ray of 0.067 is confined in the gap formed between the substrates 41 and 44. Thus, the liquid crystal display device of the comparative experiment is a reflection-type liquid crystal display device of TN-mode.

Referring to Table 4 again, it will be noted that the liquid crystal display device of the present embodiment provides a reflectivity lower than any other liquid crystal display devices of the comparative experiments in the black representation mode, and as a result, a highest contrast ratio is achieved by the liquid crystal display device of Embodiment 4.

Figure 15:
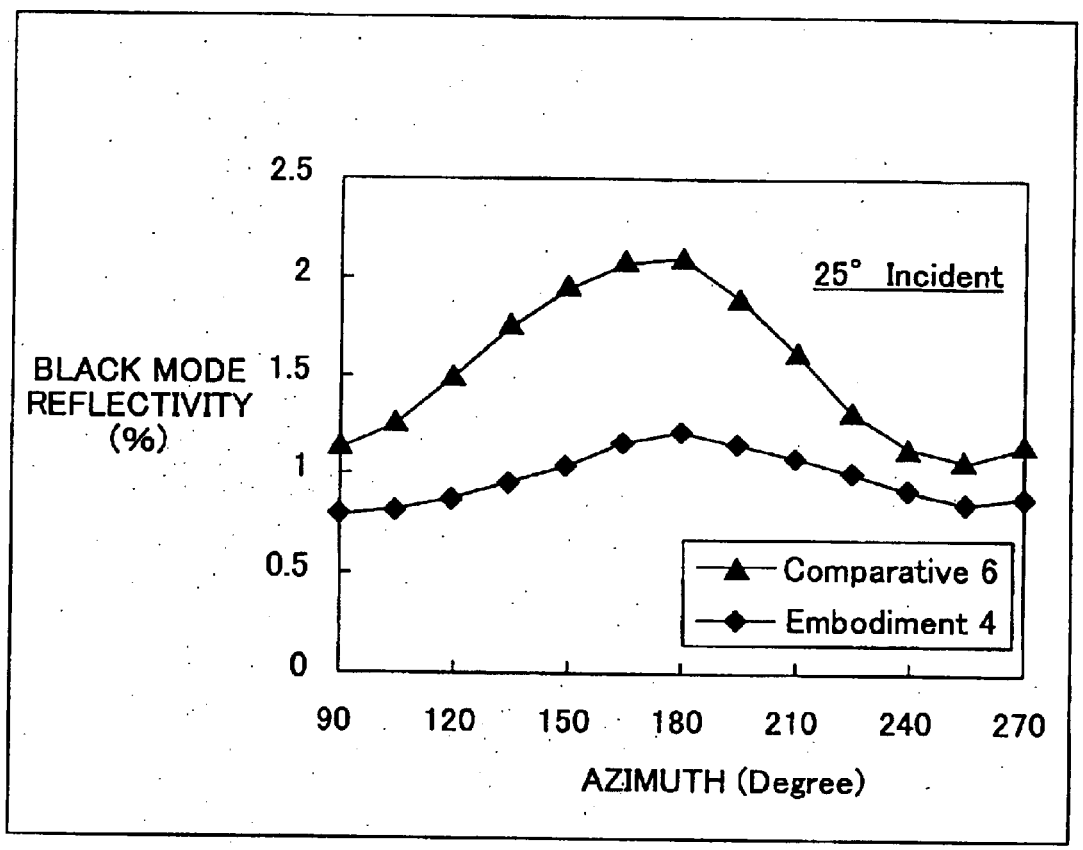
FIG. 15 is a diagram showing the azimuth dependence of reflectivity of the reflection-type liquid crystal display device of the present invention in the black representation mode together with a comparative experiment.
Figure 16:
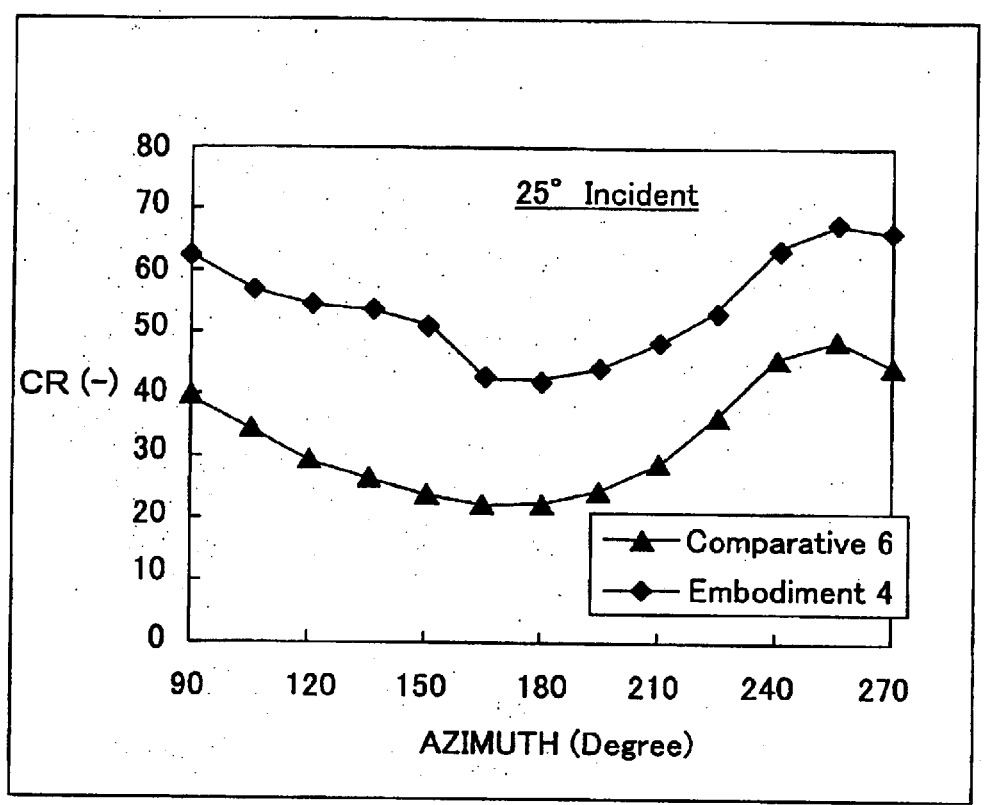
FIG. 16 is a diagram showing the azimuth dependence of contrast ratio of the reflection-type liquid crystal display device of the present invention together with a comparative experiment.

FIGS. 15 and 16 show the reflectivity and contrast ratio of the black representation mode for the VA-mode reflection-type liquid crystal display device 40 according to the present embodiment (Embodiment 4) for the case the liquid crystal display device 40 is illuminated with a spot light source with an incident angle of 25 degrees, wherein FIG. 15 shows the reflectivity while FIG. 16 shows the contrast ratio. Further, FIGS. 15 and 16 show the result of similar measurement with regard to the apparatus of the comparative experiment 6.

Referring to FIGS. 15 and 16, it can be seen that the black mode reflectivity is reduced in the reflection-type liquid crystal display device 40 of the present embodiment over the liquid crystal display device of the comparative experiment for the entire azimuth angles and improvement of contrast ratio is achieved.

Generally, there is a tendency that the reflectivity in the black representation mode becomes minimum in the reflection-type liquid crystal display device having a single polarizer in the azimuth direction corresponding to the absorption axis of the polarizer and maximum in the azimuth direction corresponding to the transmission axis.

In FIGS. 15 and 16, too, it can be seen that the reflectivity in the black representation mode takes a minimum value at the azimuth angle near 255 degrees corresponding to the absorption axis of the polarizer 47 and that a maximum contrast ratio is achieved in this azimuth angle.

Table 5 below shows the reflectivity of the black representation mode and white representation mode as well as the azimuth dependence of the contrast ratio for the liquid crystal display device 40 of Embodiment 4 in the direction of the absorption axis of the polarizer in comparison with the liquid crystal display device of the comparative experiment 6.

TABLE 5

|  | mode | reflectivity | | contrast |
| --- | --- | --- | --- | --- |
|  |  | black | white |  |
| Embodiment 4 | VA | 0.36 | 24.10 | 67.5 |
| Comparative 6 | VA | 0.44 | 21.47 | 48.7 |

Referring to Table 5, it can be seen that the reflectivity of the black representation mode is reduced by 18% in the present embodiment as compared with the comparative experiment in the azimuth angle of about 255 degrees corresponding to the direction of the absorption axis of the polarizer. Further, Table 5 indicates that the contrast ratio has increased in this azimuth angle from 48.7% to 67.5%.

[Fifth Embodiment]

Next, description will be made on a reflection-transmission-type liquid crystal display device according to a fifth embodiment of the present invention.

Figure 17:
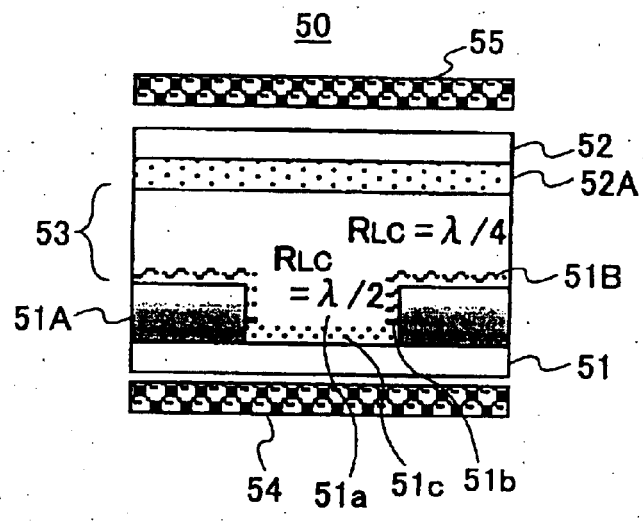
FIG. 17 is a diagram showing the construction of a conventional reflection-transmission type liquid crystal display device.

FIG. 17 shows the general construction of a conventional reflection-transmission-type liquid crystal display device.

Referring to FIG. 17, the reflection-transmission-type liquid crystal display device 50 is basically formed of a pair of glass substrates 51 and 52 and a liquid crystal layer 53 confined therebetween, wherein a transparent electrode 52A is formed on the inner surface of the glass substrate 52 uniformly. On the other hand, there is formed a planarization film 51A on the inner surface of the glass substrate 51 and, an opening 51a is formed in the planarization film 51A as an optical transmission window.

On the surface of the planarization film 51A, there is formed a reflection electrode 51B having projections and depressions, and a transparent electrode 51C is formed on the substrate 51 in correspondence to the foregoing opening 51a.

Further, there is formed a circular polarizer 54 on the outer side of the substrate 51 and another circular polarizer 55 is formed on the outer side of the substrate 52.

In the reflection-transmission type liquid crystal display device 50, in which optical switching is achieved by modulating the retardation of the liquid crystal layer 53, it is necessary to set the optical path length of the light in the liquid crystal layer 53 incident thereto through the glass substrate 52 and exit therefrom after being reflected by the reflection electrode 51B to be equal to the optical path length of the light that enters the liquid crystal layer 53 from the substrate 51 through the optical window 51a and exits after passing through the liquid crystal layer 53 and the glass substrate 52. This means that it is necessary to form the planarization film 51A to have a thickness of ½ the thickness of the liquid crystal layer 53.

However, fabrication of such a liquid crystal display device is complex in view of the need of the steps of forming the thick planarization film 51A on the substrate 51, forming the reflection electrode 51B on the planarization film 51A, forming the optical window 51a and forming a transparent electrode 51C on the substrate 51 in correspondence to the optical window 51a, in addition to ordinary manufacturing steps for fabricating a liquid crystal display device. Thus, the liquid crystal display device 50 of the conventional reflection-transmission-type suffers from the problem of increased cost.

Further, in the reflection-transmission-type liquid crystal display device 50 of FIG. 17, there arises the need of forming a barrier metal film 51b at the interface between the Al reflection electrode 51B and the transparent electrode 51C of ITO for preventing corrosion caused by electrolytic effect.

Figure 18:
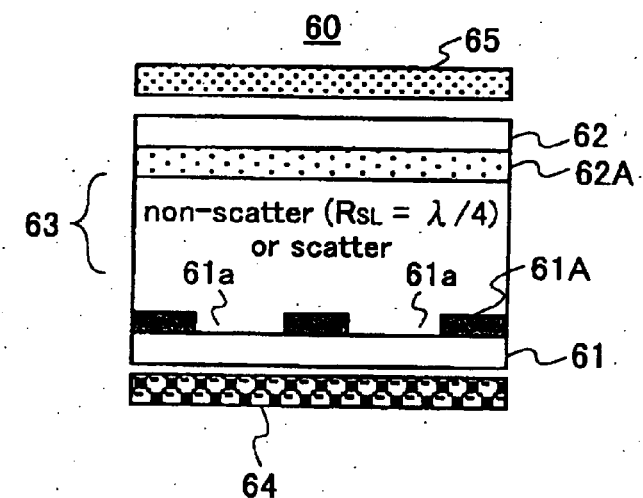
FIG. 18 is a diagram showing a first construction of a reflection-transmission-type liquid crystal display device according to a fifth embodiment of the present invention.

FIG. 18, on the other hand, shows the construction of a reflection-transmission-type liquid crystal display device 60 according to a fifth embodiment of the present invention that eliminates the foregoing problems.

Referring to FIG. 18, the liquid crystal display device 60 is basically formed of a pair of glass substrates 61 and 62 and a polymer network liquid crystal layer 63 confined therebetween, wherein a transparent electrode 62A is formed uniformly on the inner surface of the glass substrate 62.

On the inner surface of the glass substrate 61, there is formed a reflection electrode pattern 61A having a slit-shape opening 61a, and the liquid crystal layer 63 takes an optically transparent state in the non-activated state of the liquid crystal display device in which no drive voltage is applied to the liquid crystal layer 63. In the activated state in which a driving electric field is applied to the liquid crystal layer 63, on the other hand, the liquid crystal layer 63 takes a scattering state. Such a liquid crystal layer 63 may be realized y using a polymer network liquid crystal disclosed for example in the Japanese Laid-Open Patent Publication 5-27228.

Further, a circular polarizer 64 is provided on the outer side of the glass substrate 61 and a linear polarizer 65 is provided on the outer side of the glass substrate 62.

Figure 19:
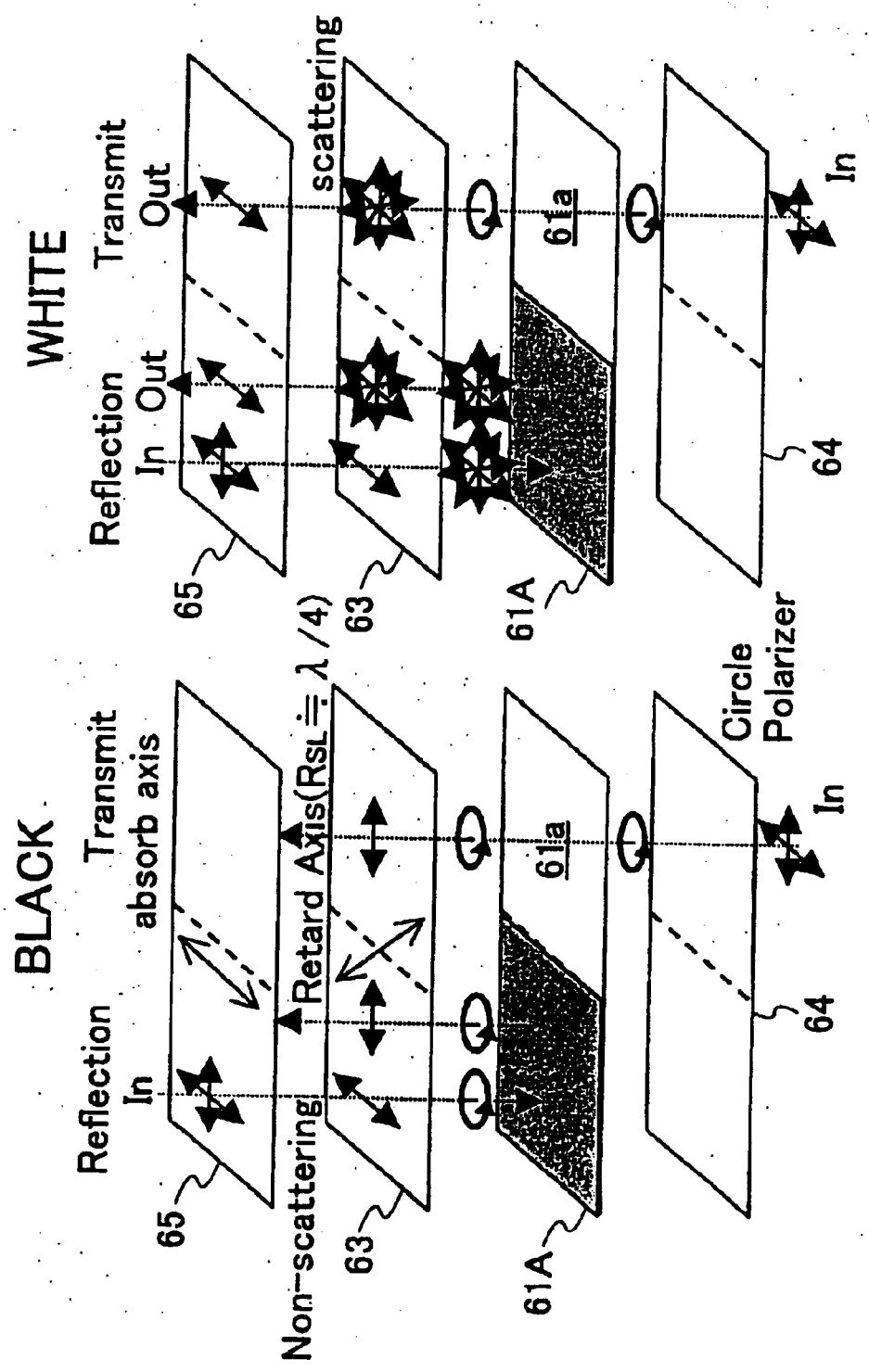
FIGS. 19A and 19B are diagrams showing the operational principle of the reflection-transmission-type liquid crystal display device of FIG. 18.

FIGS. 19A and 19B are diagrams explaining the operation of the reflection-transmission-type liquid crystal display device 60 of FIG. 18 in the black representation mode and white representation mode, respectively.

Referring to FIG. 19A, the left side of the drawing shows the reflection-mode operation while the right side shows the transmission-mode operation, wherein it will be noted that the incident light from the front side of the liquid crystal panel is converted into linearly polarized light in the reflection mode operation by the linear polarizer 65 and is converted further into circularly polarized light by the liquid crystal layer 63 of non-scattering state. It should be noted that the liquid crystal layer 63 has a retardation of about ¼ wavelength of the incident light and has a retardation axis forming an angle of 45 degrees with respect to the absorption axis of the polarizer 65. Here, it should be noted that the retardation of the liquid crystal layer 63 in the non-scattering state is by no means limited to ¼ of the incident light wavelength λ or visible wavelength but may have the value of $(0.5n+¼)λ$; n=0, 1, 2 . . . n, wherein n is a natural number.

The incident light thus converted to circularly polarized light is then reflected by the reflection electrode 61A in the state of the circularly polarized light and is converted to linear polarized light having a polarization plane crossing the initial polarization plane perpendicularly. The reflected light having such a linearly polarized state and exiting the liquid crystal layer 63 is then cut off by the linear polarizer 65, and the desired black representation is obtained.

In the transmission-mode operation, the incident light incident to the substrate 61 from the backside of the liquid crystal panel is converted circularly polarized light upon passage through the circular polarizer 64 and is introduced into the liquid crystal layer 63 through the optical window 61a in the reflection electrode 61A.

As the liquid crystal layer 63 is in the non-scattering state, the incoming circularly polarized light is converted to linearly polarized light having a polarization plane crossing the absorption axis of the linear polarizer 65 upon passage through the liquid crystal layer 63 similarly to the case of the reflected circularly polarized light explained above, and the transmission light passed through the liquid crystal layer 63 is cut off also by the linear polarizer 65.

In the white representation mode of FIG. 19B, on the other hand, the liquid crystal layer 63 is in the scattering state and the linearly polarized light passed though the linear polarizer 65 and incident to the liquid crystal layer 63 is scattered and the scattered light is reflected by the reflection electrode 61A. It should be noted that such scattered light undergoes further scattering upon passage through the liquid crystal layer 63 in the reverse direction after reflection, and as a result, the linear polarizer 65 receives the light including therein various polarization components of various polarization planes in addition to the polarization component having a polarization plane parallel to the absorption axis thereof.

Thus, the polarization component having a polarization plane crossing the absorption axis passes through the polarizer 65 in the form of linearly polarized light, and a desired white representation is obtained.

The same explanation applied also to the case of the transmission light. Thus, the incident light incident to the substrate 61 through the circularly polarized light is scattered at the liquid crystal layer 63, and those polarization components formed as a result of the scattering and having a polarization plane crossing the absorption axis of the polarizer 65 passes through the polarizer 65.

In the reflection-transmission-type liquid crystal display device of such a construction, there is no need of forming the thick planarization film 51A or electrode 51B carrying a scattering structure, or a transparent electrode 51C corresponding to the optical window 51a. It is sufficient to merely form the reflection electrode 61A patterned to form a slit on the inner surface of the substrate 61. Further, it should be noted that the reflection electrode 61A does not make a contact with the transparent electrode, and thus, there is no need of forming a barrier metal layer.

Thus, the fabrication process of the liquid crystal display device of the present embodiment is easy to produce and the fabrication cost is reduced significantly.

Further, it should be noted that the liquid crystal display device that uses the transition of state of the liquid crystal layer between the non-scattering state and scattering state has no problem of limited viewing angle, and excellent viewing angle characteristics can be achieved.

Figure 20:
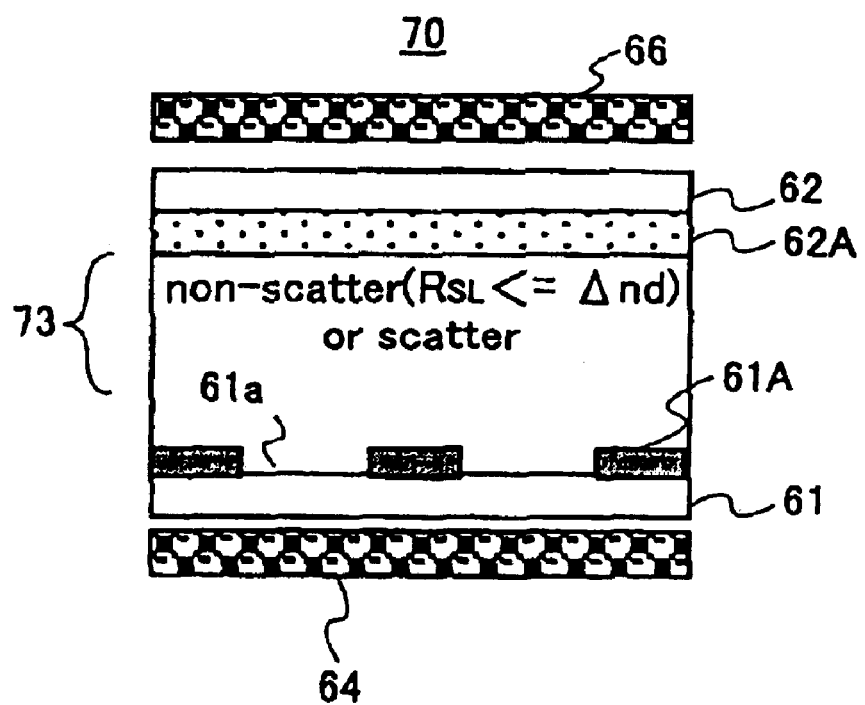
FIG. 20 is a diagram showing a second construction of a reflection-transmission-type liquid crystal display device according the fifth embodiment of the present invention.

In the example of FIG. 18, it should be noted that the liquid crystal layer has a retardation value of ¼ wavelength of the incident light in the non-scattering state. On the other hand, it is also possible to use a liquid crystal layer having a very small retardation as represented in FIG. 20, wherein it should be noted that FIG. 20 shows a liquid crystal display device 70 according to a modification of the present embodiment. In FIG. 20, those parts corresponding to the parts described previously are designated by the same reference numerals and the description thereof will be omitted.

Referring to FIG. 20, a polymer dispersion liquid crystal layer 73 having a very small in-plane retardation in the non-scattering state is used in the reflection-type liquid crystal display device 70 in place of the liquid crystal layer 63. The liquid crystal layer 73 has an in-plane retardation $Δn·d$ smaller than the product $Δn·d$ of the liquid crystal used for the scattering layer wherein $Δn$ represents the birefringence and d represents the cell thickness. It is thereby preferable to set the in-plane retardation negligible in the liquid crystal layer 73. Associated with this, the linearly polarized light is replaced by a circular polarizer 66.

Figure 21:
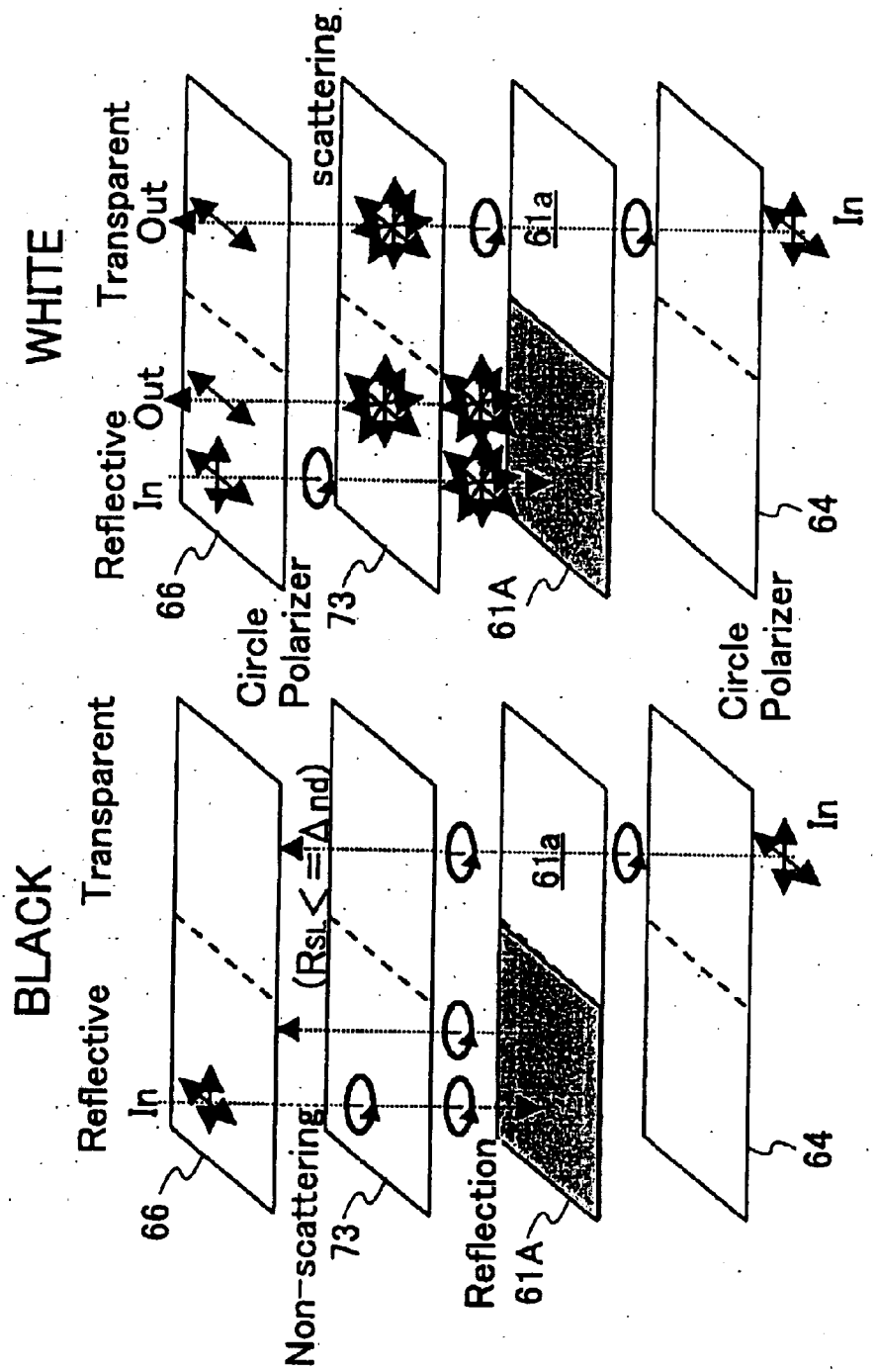
FIGS. 21A and 21B are diagrams showing the operational principle of the reflection-transmission-type liquid crystal display device of FIG. 20.

FIGS. 21A and 21B show the operation of the reflection-transmission-type liquid crystal display device 70 of FIG. 20 respectively in the black representation mode and white representation mode.

Referring to FIG. 21A, the left side of the drawing shows the reflection mode operation it the black representation mode, while the right drawing shows the transmission mode operation. Thus, in the reflection mode, the incoming light from the front side of the liquid crystal panel is converted to circularly polarized light by the circular polarizer 66, wherein the circularly polarized light thus formed passes through the liquid crystal layer 73 in the state of the circularly polarized light in view of the ignorable small retardation of the liquid crystal layer. The liquid crystal layer is in the non-scattering state.

The incident light thus passed through the liquid crystal layer 73 is reflected by the reflection electrode 61A in the circularly polarized state and passes through the liquid crystal layer 73 in the reverse direction while maintaining the circularly polarized state. The circularly polarized light thus passed through the liquid crystal layer 73 enters into the circular polarizer 66 in the reverse direction and is cut off.

In the transmission mode operation, on the other hand, the incoming light incident to the substrate 61 from the backside is converted to circularly polarized light by the circular polarizer 64 and is introduced into the liquid crystal layer 73 through the optical window 61a in the reflection electrode 61A.

As the liquid crystal layer 73 is in the non-scattering state, the incident circularly polarized light passes through the liquid crystal layer 73 while maintaining the circularly polarized state and is cut off by the circular polarizer 66 similarly to the reflected circularly polarized light explained above.

In the white representation state of FIG. 19B, the liquid crystal layer 73 is in the scattering state, and thus, the circularly polarized light incident to the liquid crystal layer 73 experiences scattering in the liquid crystal layer 73. The scattered incident light is then reflected by the reflection electrode 61A and experiences further scattering as it is propagated through the liquid crystal layer 73 in the reverse direction. As a result, the circular polarizer 66 at the front side receives various polarization components having various polarization planes.

Thus, the component having a polarization plane perpendicular to the absorption axis passes through the polarizer 66 and the desired white representation is achieved.

The same situation hold true also in the case of the transmission light in that the incoming light incident to the substrate 61 from the backside through the circular polarized light 64 is scattered in the liquid crystal layer 73, and the polarization component formed as a result of the scattering and having a polarization plane crossing the absorption axis of the polarizer 66 passes through the polarizer 66.

In the reflection-transmission-type liquid crystal display device 70 of such a construction, there is no need of forming the thick planarization film 51A or electrode 51B carrying a scattering structure thereon, or a transparent electrode 51C corresponding to the optical window 51a, contrary to the conventional reflection-transmission-type liquid crystal display device 70, and it is sufficient to form the reflection electrode 61A patterned according to the slit shape on the inner surface of the substrate 61. Further, it will be noted that the reflection electrode 61A does not make a contact with the transparent electrode, and thus, there is no need of forming a barrier metal layer. Thus, the fabrication process is simplified and the cost of the liquid crystal display device is reduced significantly.

In such a liquid crystal display device that uses transition of state of the liquid crystal layer between the non-scattering state and the scattering state, there arises no problem of limited viewing angle, and excellent viewing angle characteristics can be achieved.

Table 6 below compares the fabrication process of the conventional reflection-transmission-type liquid crystal display device 50 of FIG. 17 and the reflection-transmission-type liquid crystal display device 70 or 70 of the present invention.

TABLE 6

| | Conventional | Present invention |
|---|---|---|
| planarization film | necessary | not necessary |
| surface scattering structure | necessary | not necessary |
| transparent electrode | necessary | not necessary |
| reflection electrode | necessary | necessary |

Referring to Table 6, it will be noted that the present invention can eliminate the step of forming the planarization film 51A, the step of forming the projection and depression pattern 51B on the planarization film 51A and further the step of forming the transparent electrode 51C on the optical window.

Thus, in the present invention, it is sufficient to merely pattern the reflection electrode and the fabrication process of the reflection-transmission-type liquid crystal display device is simplified substantially.

Figure 22:
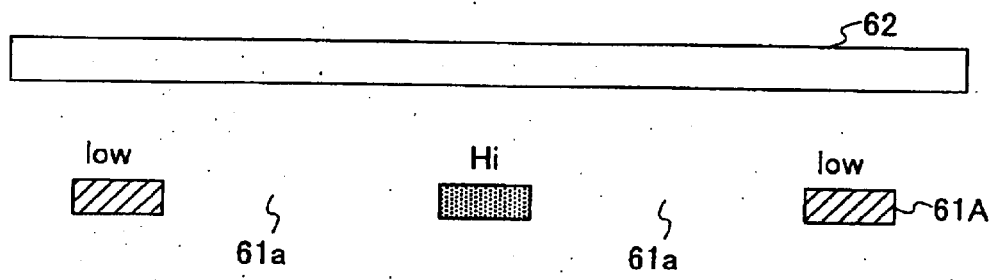
FIG. 22 is a diagram showing an example of a driving method used in the fifth embodiment of the present invention.
Figure 23:
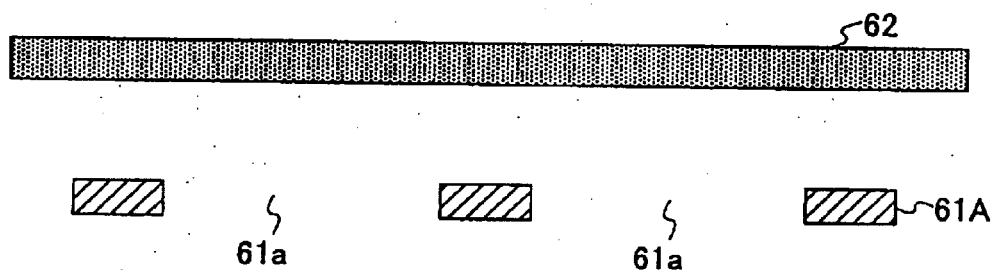
FIG. 23 is a diagram showing another example of the driving method used in the fifth embodiment of the present invention.
Figure 24:
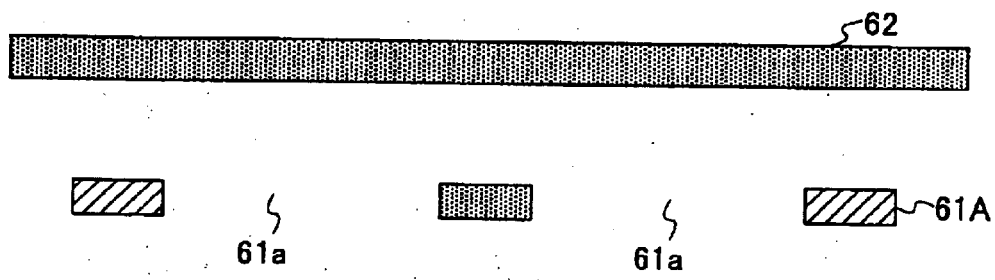
FIG. 24 is a diagram showing a further example of the driving method used in the fifth embodiment of the present invention.

Meanwhile, in the reflection-transmission-type liquid crystal display device 60 of FIG. 18 or in the in the reflection-transmission-type liquid crystal display device 70 of FIG. 20, in which a uniform electrode is formed on a front substrate and a slit-shape electrode pattern is formed on the rear substrate, there are several possible driving modes for applying a driving electric field to the liquid crystal layer 63 as represented in FIGS. 22–24.

FIG. 22 is a so-called lateral electric field mode or IPS mode and a drive voltage is applied across a pair of mutually adjacent electrode fingers of the interdigital electrode constituting the reflection electrode.

FIG. 23, on the other hand, shows a driving mode designated herein as vertical electric field mode or S mode for distinction from the IPS mode, wherein a drive electric voltage is applied between the opposing electric field 62 and the reflection electric field 61A.

Further, FIG. 24 shows a driving mode designated hereinafter as one-side vertical electric field mode or sS mode in which the IPS mode and the S mode noted above are combined. Thus, in the driving mode of FIG. 24, the opposing electrode 62 and one of the electrode fingers are driven to a first voltage level and the electrode fingers at both sides are driven to a second drive voltage.

FIG. 25A shows an example of the construction of the reflection electrode 61A used in the S driving mode of FIG. 23, while FIG. 25B shows the construction of the reflection electrode 61A used in the IPS driving mode of FIG. 22 or sS driving mode of FIG. 24.

Referring to FIG. 25A, there is formed a TFT 61T, a gate electrode 61G and a data electrode 61D on the glass substrate 61, and an electrode having a slit in corresponding to the transmission region 61a is formed as the reflection electrode 61A.

In the construction of FIG. 25B, on the other hand, plurality interdigital electrodes 61A₁ and 61A₂ are formed on the glass substrate 61 alternately in addition to the TFT 61T, gate electrode 61G and the data electrode 61D, wherein the interdigital electrode 61A2 is connected to a common line 61C. Further, there is formed a gap between the electrode 61A₁ and the electrode 61A₂ in correspondence to the transmission region 61a.

By using the TFT substrate of FIG. 25A or FIG. 25B for the substrate 61 and assembling the substrates 61 and 62 together via a spacer having a diameter of 5 μm, liquid crystal display devices having the construction of the liquid crystal display device 60 of FIG. 18 have been manufactured respectively for testing the IPS driving mode, S driving mode and the sS driving mode. Thereby, a horizontal alignment film is formed on each of the substrates 61 and 62, and the alignment film is subjected to a rubbing process such that the liquid crystal molecules cause a homogeneous alignment in the direction perpendicular to the slit direction.

Further, a liquid crystal mixture of a UV-curable liquid crystal and a liquid crystal having a birefringence Δn of 0.2306 and a dielectric anisotropy Δ∈ of 15.1 is confined into the gap formed between the substrates 61 and 62. Further, by conducting ultraviolet irradiation, a polymer network scattering layer is formed in the liquid crystal layer 63.

Figure 26:
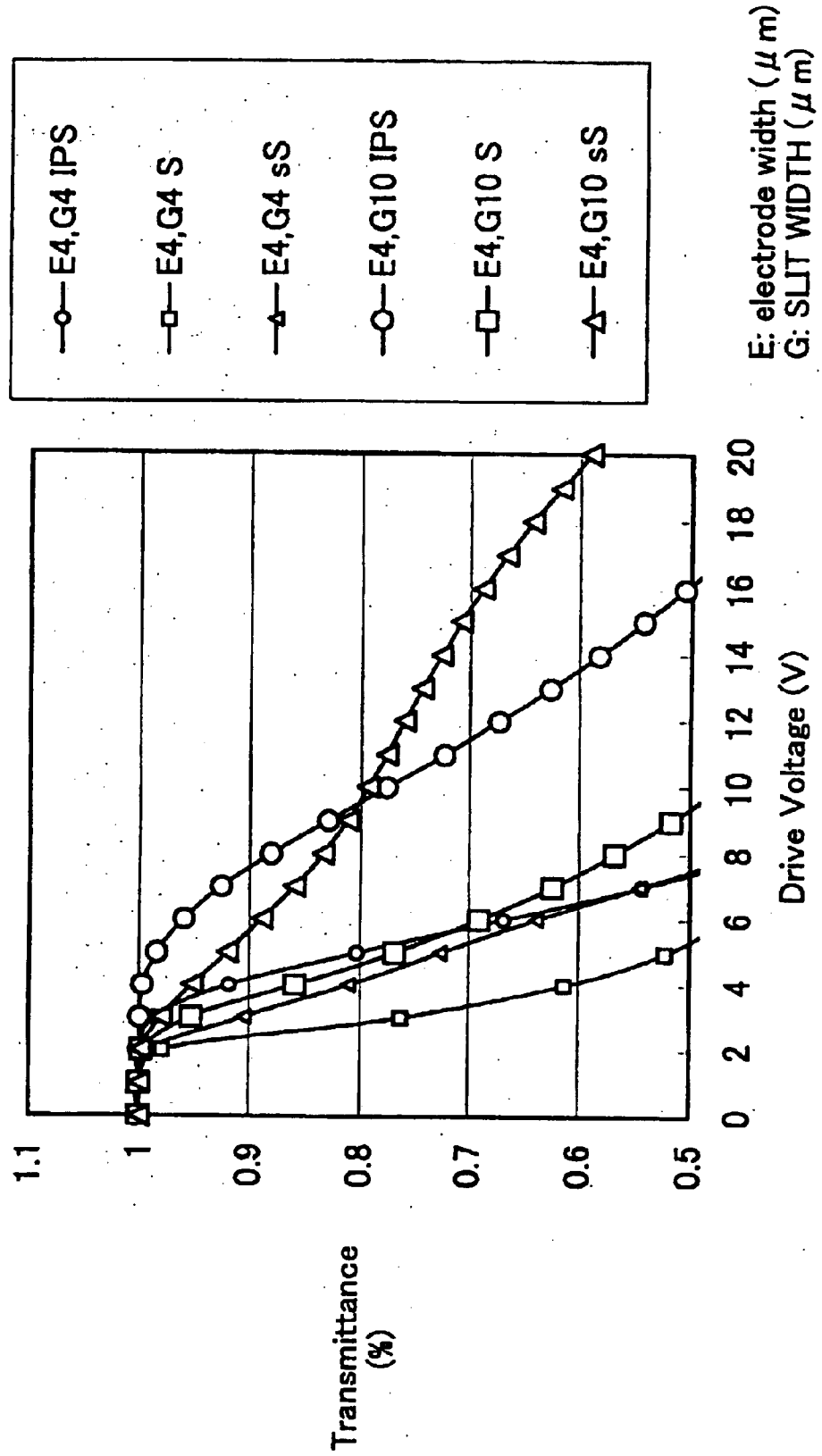
FIG. 26 is a diagram showing the operational characteristics of the reflection-transmission-type liquid crystal display device of the present embodiment.

FIG. 26 shows the relationship between the applied drive voltage and the transmittance for the reflection-transmission-type liquid crystal display device 60 thus formed for the case the width E of the electrode pattern 61A is set to 4 μm and the width G of the slit 61a is changed variously. In FIG. 26, it should be noted that the electrode width E and the slit width G are represented in terms of microns. Further, the transmittance is normalized by the transmittance in the non-activated state.

Referring to FIG. 26, it will be noted that the drive voltage is reduced with reducing slit width G and that a minimum drive voltage is achieved in the case of using the S driving mode.

In another experiment of the present embodiment, a liquid crystal display device having the construction of FIG. 18 is formed by using the TFT substrate of the construction shown in FIG. 25A or 25B.

In this experiment, a horizontal alignment film is formed on the surface of the substrate 61 or opposing substrate 62 by a PVA film or a soluble polyimide film. After applying a rubbing process to the alignment film for causing a homogenous alignment in the liquid crystal molecules, the substrates 61 and 62 are assembled together with intervening spacers each having a diameter of 2.3 μm, and a liquid crystal mixture containing a nematic liquid crystal having a birefringence Δn of 0.067 added with a UV-curable liquid crystal containing a polymerization starter with a proportion of 10 weight % is introduced into the gap formed between the substrates 61 and 62.

Further, by applying ultraviolet radiation to the liquid crystal panel thus formed, there is formed a polymer network liquid crystal having a retardation of 154 nm.

Further, a linear polarizer 65 is provided on the outer side of the substrate 62 such that the transmission axis of the polarizer 65 is oriented with an angle of about 45 degrees from the direction of alignment of the liquid crystals. Further, a circular polarizer 64 is provided at the outer side of the substrate 61.

Thus, it becomes possible to produce the reflection-transmission-type liquid crystal display device 60 with low cost.

In another experiment, the reflection-transmission-type liquid crystal display device 70 of FIG. 20 is manufactured by using a TFT substrate having a construction of FIG. 25A or 25B for the TFT substrate 61.

In this experiment, the substrate 61 and the opposing substrate 62 are assembled together via intervening spacers having a diameter of 6 μm, and a liquid crystal mixture containing a liquid crystal having a birefringence Δn of 0.23 added with a UV-curable resin monomer with a proportion of 20 weight %, is introduced into the gap formed between the substrates 61 and 62. By applying ultraviolet irradiation to the liquid crystal layer thus formed, the polymer-dispersed liquid crystal layer 73 is obtained.

By providing the circular polarizers 64 and 66 at respective outer sides of the TFT substrate 61 and the opposing substrate 62, the reflection-transmission-type liquid crystal display device 70 that provides the white representation mode in the non-activated state where no drive voltage is applied and the black representation mode in the activated state, is obtained.

In a further experiment, the reflection-transmission-type liquid crystal display device 70 of FIG. 20 is formed by using a TFT substrate of the construction shown in FIG. 25A or 25B for the substrate 61.

In this experiment, a vertical alignment film of PVA or soluble polyimide is formed on the surface of the substrates 61 and 62, and the substrates 61 and 62 are assembled together via spacers having a diameter of 5 μm. Further, a liquid crystal mixture containing a liquid crystal having a birefringence Δn of 0.23 added with a UV-curable resin containing a polymerization starter with a proportion of 10 weight % is introduced into the gap formed between the substrates 61 and 62, and the polymer network liquid crystal layer 73 is obtained by applying ultraviolet irradiation.

The reflection-transmission-type liquid crystal display device 70 is then completed, by providing the circular polarizers 64 and 66 at respective outer sides of the TFT substrate 61 and the opposing substrate 62, wherein the liquid crystal display device 70 thus formed provides the black representation mode in the non-activated state in which no drive voltage is applied and the white representation mode in the activated state.

Figure 27:
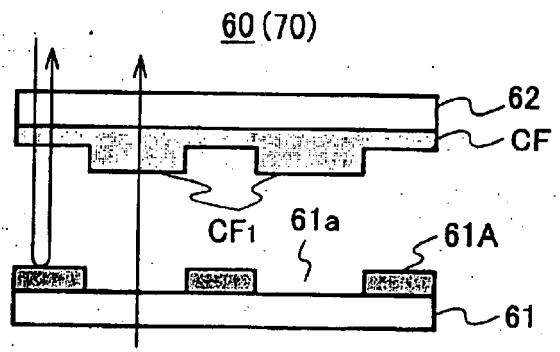
FIG. 27 is a diagram showing the construction of a color filter used in the reflection-transmission-type liquid crystal display device of the present embodiment.

FIG. 27 shows an example of providing a color filter CF to any of the reflection-transmission-type liquid crystal display device 60 of FIG. 18 or the reflection-transmission-type liquid crystal display device 70 of FIG. 20.

Referring to FIG. 27, it will be noted that the light incident through the substrate 62 from the front direction and reflected by the reflecting electrode 61A is passed through the color filter CF twice, while the light incident from the backside through the TFT substrate 61 passes through the color filter CF only once.

Thus, in the case the color filter CF has a uniform color purity, there arises a problem in that the color purity of the reflected light and the color purity of the transmission light may be difference.

Thus, in the construction of FIG. 27, a part $CF_1$ of the color filter CF corresponding to the transmission region 61a is formed to have a thickness twice as large as the remaining part of the color filter CF such that both the transmission light and the reflection light has the same color purity.

Figure 28:
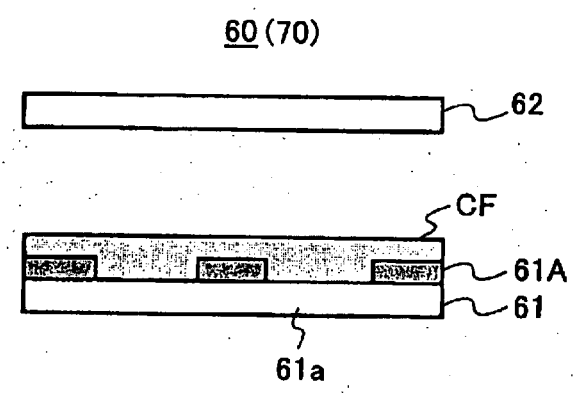
FIG. 28 is a diagram showing another construction of the color filter used in the reflection-transmission-type liquid crystal display device of the present invention.

FIG. 28 shows a modification of FIG. 27, wherein it will be noted that the color filter CF is formed on the substrate 61 and the thickness of the color filter CF is adjusted by using the reflection electrode 61F.

Figure 29:
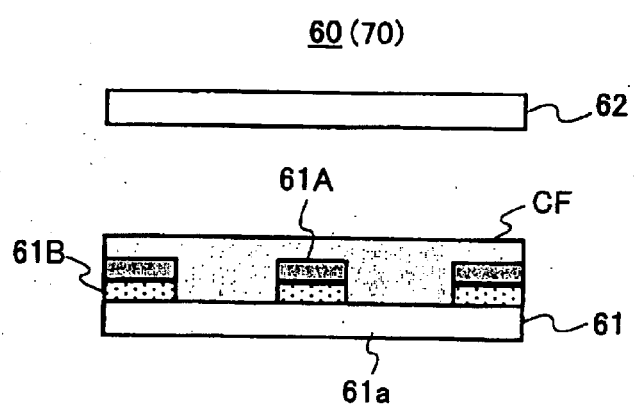
FIG. 29 is a diagram showing a further construction of the color filter used in the reflection-transmission-type liquid crystal display device of the present invention.

Thus, by forming the color filter CF on the substrate 61 with a thickness twice as large as that of the reflection electrode 61A, it becomes possible to set the thickness of the color filter CF for the part located on the transmission region 61a to be twice as large as the thickness of the color filter CF on the electrode 61A. In the construction of FIG. 29, such an adjustment of thickness of the color filter CF is achieved in a self-aligned manner, and there is no need of any patterning process.

FIG. 29 shows a modification of FIG. 28 in which there is formed a pattern 61B underneath the reflection electrode 61A by a resist film or the like, in conformity with the reflection electrode 61A.

According to such a construction, the reflection electrode 61A is formed at an elevated position on the substrate 61 as compared with the case of FIG. 28. It should be noted that the construction of FIG. 29 is effective particularly when the thickness of the reflection electrode 61A is small and coloring of the reflection light can be achieved sufficiently in the construction of FIG. 28.

Further, the present invention is not limited to the embodiments explained heretofore, but various variations and modifications may be made without departing from the scope of the invention.

What is claimed is:

1. A reflection-transmission-type liquid crystal display device, comprising:
   a first substrate;
   a second substrate provided so as to face said first substrate;
   a transparent electrode provided on a surface of said first substrate facing said second substrate;
   a reflection electrode provided on a surface of said second substrate facing said first substrate, said reflection electrode having an opening;
   a scattering layer provided between said first and second substrates, said scattering layer including therein a liquid crystal layer and changing an optical state thereof between a scattering state and a non-scattering state; and
   a pair of polarizers disposed at outer sides of a liquid crystal panel formed by said first substrate, said second substrate and said scattering layer,
   at least one of said polarizers is formed of a circular polarizer.

2. A reflection-transmission-type liquid crystal display device as claimed in claim 1, wherein each of said pair of polarizers is formed of a circular polarizer.

3. A reflection-transmission-type liquid crystal display device as claimed in claim 1, wherein one of said pair of polarizers is a linear polarizer.

4. A reflection-transmission-type liquid crystal display device as claimed in claim 1, wherein said scattering layer has a retardation of $(0.5n+\frac{1}{4})\lambda$, where $\lambda$ is the wavelength of visible light and n is a natural number in said non-scattering state thereof.

5. A reflection-transmission-type liquid crystal display device as claimed in claim 1, wherein said scattering layer has an in-plane retardation in said non-scattering state thereof such that said in-plane retardation is smaller than a product $\Delta n \cdot d$, where $\Delta n$ is the birefringence of a liquid crystal layer constituting said scattering layer and d is the thickness of said liquid crystal layer.

6. A reflection-transmission-type liquid crystal display device as claimed in claim 1, wherein said reflection electrode has a slit shape.

7. A reflection-transmission-type liquid crystal display device as claimed in claim 1, wherein any of said first and second substrates carries a color filter, said color filter having a reflection region corresponding to said reflection electrode and a transmission region corresponding to said transmission region, said color filter having different color purities in said reflection region and in said transmission region.

8. A reflection-transmission-type liquid crystal display device as claimed in claim 7, wherein said color filter is provided on said reflection electrode.

* * * * *

UNITED STATES PATENT AND TRADEMARK OFFICE
CERTIFICATE OF CORRECTION

PATENT NO.   : 6,930,736 B2
DATED        : August 16, 2005
INVENTOR(S)  : Tashiro et al.

It is certified that error appears in the above-identified patent and that said Letters Patent is hereby corrected as shown below:

Title page,
Item [73], Assignee, delete "Fujitsu Display Technologies Corporation, Kawasaki (JP)" and insert -- Sharp Kabushiki Kaisha, Osaka (JP) --.

Signed and Sealed this

Third Day of January, 2006

JON W. DUDAS
*Director of the United States Patent and Trademark Office*